(12) United States Patent
McDowell et al.

(10) Patent No.: US 11,544,733 B2
(45) Date of Patent: Jan. 3, 2023

(54) SYSTEM AND METHOD FOR CONTEXT TRANSPORTATION USER EXPERIENCE

(71) Applicant: Change Transit Ltd., Toronto (CA)

(72) Inventors: Michael McDowell, Toronto (CA); Joseph Garvey, Toronto (CA); Aleksey Sergeyev, Toronto (CA); Fabio Neves, Toronto (CA); David Krett, Toronto (CA); Bruno Neves, Toronto (CA); Kelvin Luu, Toronto (CA); Kyle McInnes, Toronto (CA); Naveen Mahadevamangal, Toronto (CA); Purav Makwana, Toronto (CA); Rohini Narang, Toronto (CA); Sahar Abbasi, Toronto (CA); Nitesh Dulal, Toronto (CA); Aashirvad Khatanhar, Toronto (CA); Kundan Joshi, Toronto (CA); Leonardo Rota-Rossi, Toronto (CA); Daniel Shakhmundes, Niagara-on-the-Lake (CA)

(73) Assignee: CHANGE TRANSIT, LTD., Toronto (CA)

( * ) Notice: Subject to any disclaimer, the term of this patent is extended or adjusted under 35 U.S.C. 154(b) by 357 days.

(21) Appl. No.: 16/958,409

(22) PCT Filed: Jan. 2, 2019

(86) PCT No.: PCT/IB2019/050038
§ 371 (c)(1),
(2) Date: Jun. 26, 2020

(87) PCT Pub. No.: WO2019/135186
PCT Pub. Date: Jul. 11, 2019

(65) Prior Publication Data
US 2021/0056582 A1    Feb. 25, 2021

Related U.S. Application Data

(60) Provisional application No. 62/614,075, filed on Jan. 5, 2018.

(51) Int. Cl.
*G06Q 30/02* (2012.01)
*G01C 21/36* (2006.01)
(Continued)

(52) U.S. Cl.
CPC ..... *G06Q 30/0236* (2013.01); *G01C 21/3661* (2013.01); *G06Q 20/045* (2013.01); *G06Q 30/0258* (2013.01); *G06Q 50/30* (2013.01)

(58) Field of Classification Search
CPC ............. G06Q 30/0236; G06Q 20/045; G06Q 30/0258; G06Q 50/30; G06Q 10/047;
(Continued)

(56) References Cited

U.S. PATENT DOCUMENTS

| | | |
|---|---|---|
| 8,225,997 B1 | 7/2012 | Bierbaum et al. |
| 8,693,458 B2 | 4/2014 | Smartt et al. |
| 8,892,460 B2 | 11/2014 | Golden et al. |

FOREIGN PATENT DOCUMENTS

FR    3028986 A1 *    5/2016

OTHER PUBLICATIONS

Booz Allen Hamilton, Smartphone Applications To Influence Travel Choices, 2016 (Year: 2016).*

(Continued)

*Primary Examiner* — Tarek Elchanti

(57) ABSTRACT

What is disclosed is a system to enable a user with an associated user device to receive a context dependent transportation experience, further wherein said system comprises a framework comprising one or more components, wherein said one or more components are coupled to each other and the user device via one or more interconnections; wherein (Continued)

said framework determines at least one context associated with said user and said user device; and wherein based on said determined context, said framework performs one or more actions.

18 Claims, 28 Drawing Sheets

(51) Int. Cl.
  *G06Q 20/04* (2012.01)
  *G06Q 50/30* (2012.01)
(58) Field of Classification Search
  CPC .... G06Q 30/02; G01C 21/3661; G01C 21/20; G01C 21/3423; H04W 4/024
  USPC ..................................................... 705/14.36
  See application file for complete search history.

(56) References Cited

OTHER PUBLICATIONS

Shreih, Raghid, "International Search Report and Written Opinion", International Application No. PCT/IB2019/050038, dated Apr. 18, 2019, 9 pages.

\* cited by examiner

SYSTEM AND METHOD FOR CONTEXT TRANSPORTATION USER EXPERIENCE

FIELD OF THE INVENTION

The present disclosure relates to provision of services and content to transportation system users.

SUMMARY

A system to enable a user with an associated user device to receive a context dependent transportation experience, further wherein said system comprises a framework comprising one or more components, wherein said one or more components are coupled to each other and the user device via one or more interconnections; wherein said framework determines at least one context associated with said user and said user device; and wherein based on said determined context, said framework performs one or more actions.

A method to enable a user with an associated user device to receive a context dependent transportation experience, further wherein said method comprises determining, by a framework, at least one context associated with said user and said user device, said framework comprising one or more components, wherein said one or more components are coupled to each other and the user device via one or more interconnections; and based on said determined at least one context, performing, by said framework, one or more actions.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1A:
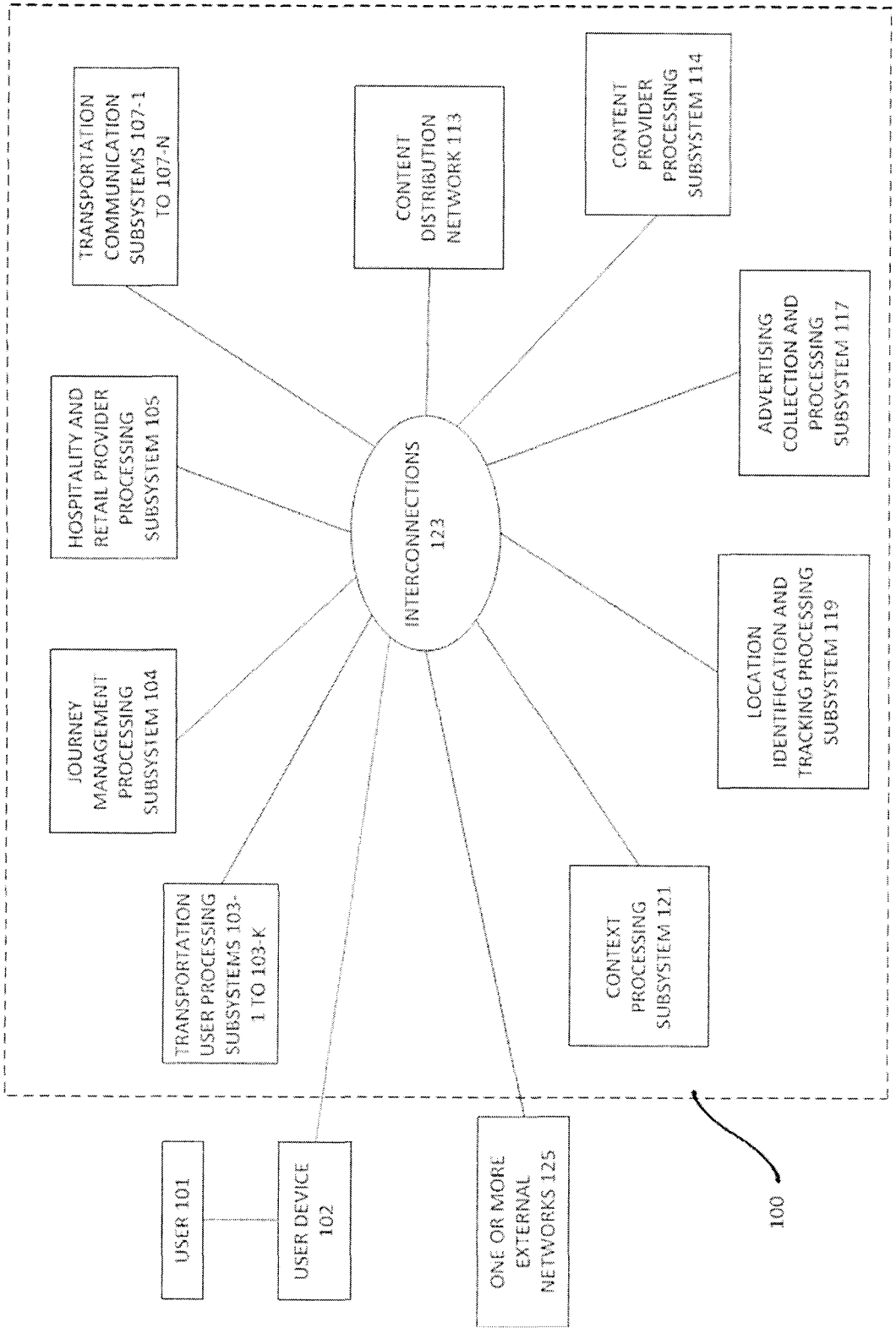
FIG. 1A is an illustration of one embodiment of a framework.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Currently there are many applications to enable users to plan journeys from their mobile devices using transit or transportation systems. Examples include TransitApp, GOOGLE® Maps, CommuteStream, Moovit and Conduent.

Delivering an enhanced transportation user experience is more likely to succeed if some factors are taken into account. Firstly, knowledge of a user's context will assist in tailoring the transportation experience to the user's needs, and thereby help deliver an enhanced transportation user experience.

Secondly taking a holistic view of a user's transportation experience is likely to further enhance the user's transportation experience. As was explained in the article "Understanding commercial synergies between public transport and services located around public transport stations." by Ferreira, Marta Campos, Vera Costa, Teresa Galvão Dias, and João Falcão e Cunha. Transportation Research Procedia 27 (2017): 125-132 and presented at 20th EURO Working Group on Transportation Meeting, EWGT 2017, 4-6 Sep. 2017, Budapest, Hungary (the "Ferreira reference"): " . . . the transport system must be looked holistically and in context".

The Ferreira reference goes on to state:

"Based on the fact that every trip has a purpose, such as work, school, recreation, social, we propose a multiservice approach in order to engage and attract new passengers to public transport.

This multiservice approach consists of creating partnerships among city services and public transport, in order to encourage people to use cleaner transport modes during their daily commute. These partnerships may include discounts, combined packages, reduced prices, deals, marketing campaigns and others. Such initiatives will contribute to modernize the image of transport operators, improve quality of service, attract new customers and retain the existing ones. On the other hand, it will also boost local businesses, due to increased awareness, loyalty and sales. Customers benefit from convenience, availability, better services, and increased savings."

The existing applications listed above have limited functionalities, meaning that these applications only take care of a limited number of aspects related to a user's journey. For example, Transit App performs the following functions:

Delivery of real-time service alerts to users;
Journey management; and
Integration with car sharing, bike sharing and ride sharing.

However there is no discussion of integration with retail, loyalty programs, discounts and so on.

The CommuteStream application assists in providing journey management; delivering targeted mobile advertising to transit users; and optimizes delivery of advertising based on journey patterns of users. However, similar to Transit App there is very little discussion of integration with retail.

The Moovit application assists in providing real time transit analytics, and provides video to users via NETFLIX®. However there is very little discussion of integration with retail or other services.

The Conduent application assists in delivering personalized, hyperlocal, mobile offers to transit riders. However there is no discussion of meeting users' entertainment needs, for example.

The GOOGLE® Maps application provides journey management and real-time alerting functionalities. However, the GOOGLE® Maps application on its own offers very little other than this.

Therefore each of these applications cited above do not take a holistic view of the user's transportation experience. These applications are therefore less likely to enhance a user's transportation experience, when compared to an application which embraces a holistic view.

Therefore having a single application which embraces a holistic view of the user's transportation experience and delivers a transportation experience customized to the user's context, has the effect of making such an application a "one stop shop" for the user whenever he/she decides to take a journey. This means that a user is unlikely to leave the application once he/she has logged in. This makes such an application valuable to advertisers, since using the application as an advertising channel gives advertisers greater exposure to users when users are undertaking journeys. If transportation system providers are able to share in the generated advertising revenue, this enables transportation system providers to increase their overall revenue.

Furthermore, having users who are reluctant to leave the application means that more data related to the users can be recorded. This improves the accuracy of performing context processing and determination. This data can also be used by transportation system providers to increase the accuracy of future predictions based on user behavior, which improves the planning capabilities of the transportation system providers.

A system and method for a framework to provide a context dependent transportation user experience in a holistic manner is presented below. As will be shown, this system and method provides for users' journey management, entertainment and retail needs. It also provides for loyalty programs, and provides advertising revenue attribution for various transportation system providers.

FIG. 1A shows an embodiment of the system and method that is the subject of this specification. User 101 is a user of a transportation system. User 101 has associated user device 102. User device 102 is, for example a smartwatch, smartphone, tablet, laptop, or any appropriate computing and network-enabled device.

Figure 1B:
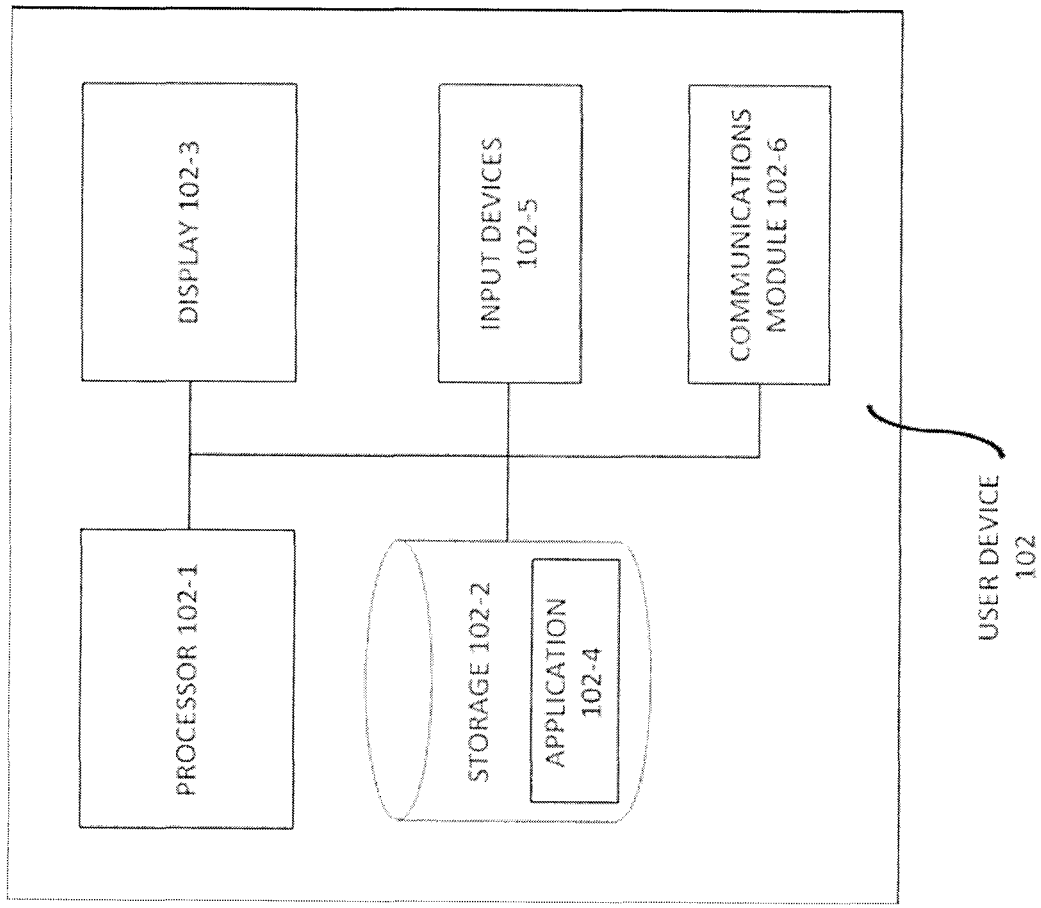
FIG. 1B is an illustration of one embodiment of a user device.

An embodiment of user device 102 is shown in FIG. 1B. Processor 102-1 performs processing functions and operations necessary for the operation of user device 102, using data and programs stored in storage 102-2. An example of such a program is application 102-4 which will be discussed in more detail below. Display 102-3 performs the function of displaying data and information for user 101. Input devices 102-5 allow user 101 to enter information. This includes, for example, devices such as a touch screen, mouse, keypad, keyboard, microphone, camera, video camera and so on. In one embodiment, display 102-3 is a touchscreen which means it is also part of input devices 102-5. Communications module 102-6 allows user device 102 to communicate with devices and networks external to user device 102. This includes, for example, communications via BLUETOOTH®, Wi-Fi, Near Field Communications (NFC), Radio Frequency Identification (RFID), 3G, Long Term Evolution (LTE), Universal Serial Bus (USB) and other protocols known to those of skill in the art. The components of user device 102 are coupled to each other as shown in FIG. 1B.

Framework 100 comprises various components as shown in FIG. 1A. These components perform various functions necessary for the functioning of the system and method that is the subject of this specification. User 101 connects to framework 100 via user device 102 and, for example, communications module 102-6. In some embodiments, user 101 communicates with the components of framework 100 via the application 102-4 which runs on user device 102 as shown in FIG. 1B.

In one embodiment, as shown in FIG. 1A, each of the components of framework 100 are coupled to each other and user device 102 via interconnections 123. Interconnections 123 comprise a variety of networking and communication technologies. In some embodiments, interconnections 123 comprise at least one public network. In some embodiments, interconnections 123 comprise at least one private network. In some embodiments, interconnections 123 comprise wireless technologies such as WiFi, BLUETOOTH®, NFC, 3G and LTE. In some embodiments, interconnections 123 comprise wired technologies such as Firewire, Universal Serial Bus (USB), Ethernet, optical networks. In some embodiments, interconnections 123 comprise Local Area Networks (LANs), Metropolitan Area Networks (MANs) and other appropriate networking technologies. In some embodiments, interconnections 123 comprise one or more subnetworks.

Transportation systems comprise, for example:
transit systems such as
subway systems,
surface rail systems,
tram/streetcar systems, and
bus systems; and
shared ride systems such as LIBER®, NETLIFT® and LYFT®;
bikesharing services such as BIXI®;
hourly rental services such as CAR2GO®;
connected car services such as TELUS® Drive+; and
long-distance transportation systems including
passenger flights,
long distance bus services, and
long-distance train services.

Transportation user processing subsystems 103-1 to 103-K perform the functions of storing and managing data for a user of a transportation system such as user 101. These functions include, for example, storing stored value tickets, determining fares, storing credit card information for payment of fares and tips, auto-loading funds from credit cards belonging to user 101 to replenish the value of a stored value ticket belonging to user 101, storing fares paid and other information belonging to user 101 necessary to access a transportation system. In some embodiments, one or more of these functions are performed by transportation user processing subsystems 103-1 to 103-K in conjunction with third party payment processors.

In some embodiments, each transportation user processing subsystem stores and manages data for one or more transportation systems. As an example, the METROLINK® PRESTO® subsystem stores and manages data for a user who uses any of the Toronto GO® Train transportation system, the Toronto Transit Commission (TTC) system and the MiWay transportation system. In some embodiments, transportation user processing subsystems 103-1 to 103-K communicates with user device 102 via application 102-4 running on user device 102. In some embodiments, at least one of the transportation user processing subsystems 103-1 to 103-K performs functions related to managing loyalty point and reward programs for user 101 via user device 102. These rewards include, for example, fare discounts, transit authority merchandise, retail partner merchandise and other items. In some embodiments, the functions performed include handling damage reports submitted via application 102-4. This includes, for example, receiving images of damaged equipment from a camera which is part of input devices 102-5 on user devices 102, receiving text reports of damage equipment, and receiving tweets comprising information on damaged equipment. In some embodiments, at least one of the transportation user processing subsystems 103-1 to 103-K are used to offer rewards to user device 102 via application 102-4.

A variety of implementations are possible for transportation user processing subsystems 103-1 to 103-K. In some embodiments, a transportation user processing subsystem is implemented using a combination of hardware and software. In some other embodiments, a transportation user processing subsystem is implemented using one or more servers. In some embodiments, these servers are geographically distributed.

Journey management processing subsystem 104 performs functions necessary to assist user 101 to plan a trip or journey. In some embodiments, user 101 accesses this functionality using application 102-4 running on user device 102. User 101 is able to, for example, check travel options available in a region of interest, see custom alerts from one or more transit agencies and purchase tickets ahead of time.

Using application 102-4 running on user device 102, a user 101 is able to, for example, enter a starting point, end point and select a criteria which best suits their needs. Examples of criteria include price, least transfers, least walking, fastest route and first class options. Then journey management processing subsystem 104 calculates parameters such as departure time, arrival times and journey duration in real time. This data is then transmitted to user device 102 for display via, for example, application 102-4 and display 102-3. In a further embodiment, journey management processing subsystem 104 communicates with one or more mapping programs and services such as, for example, GOOGLE® Maps to enable user 101 to plan trips using user device 102 and application 102-4. In further embodiments, application 102-4 interacts with other applications which run on user device 102 such as GOOGLE® Maps to enable trip planning and management. In some embodiments, journey management processing subsystem 104 offers journeys with multiple stages, each stage using the same or a different mode of transportation. For example, in some embodiments journeys comprise one or more walking stages combined with one or more rideshare or bikeshare stages and one or more transit stages. In further embodiments, users have a choice of language. In other embodiments, users have a choice of viewing distances in either kilometres or miles.

In some embodiments, journey management processing subsystem 104 also provides alerts to user device 102 via application 102-4. In some of these embodiments, journey management processing subsystem 104 receives alerts from sources such as:

a transit authority's Rich Site Summary (RSS) feed, one or more social media accounts belonging to a transit authority, information from one or more websites belonging to a transit authority, and direct entry by a developer working with a transit authority.

Then journey management processing subsystem 104 then provides alerts to user device 102 via application 102-4.

Figure 1C:
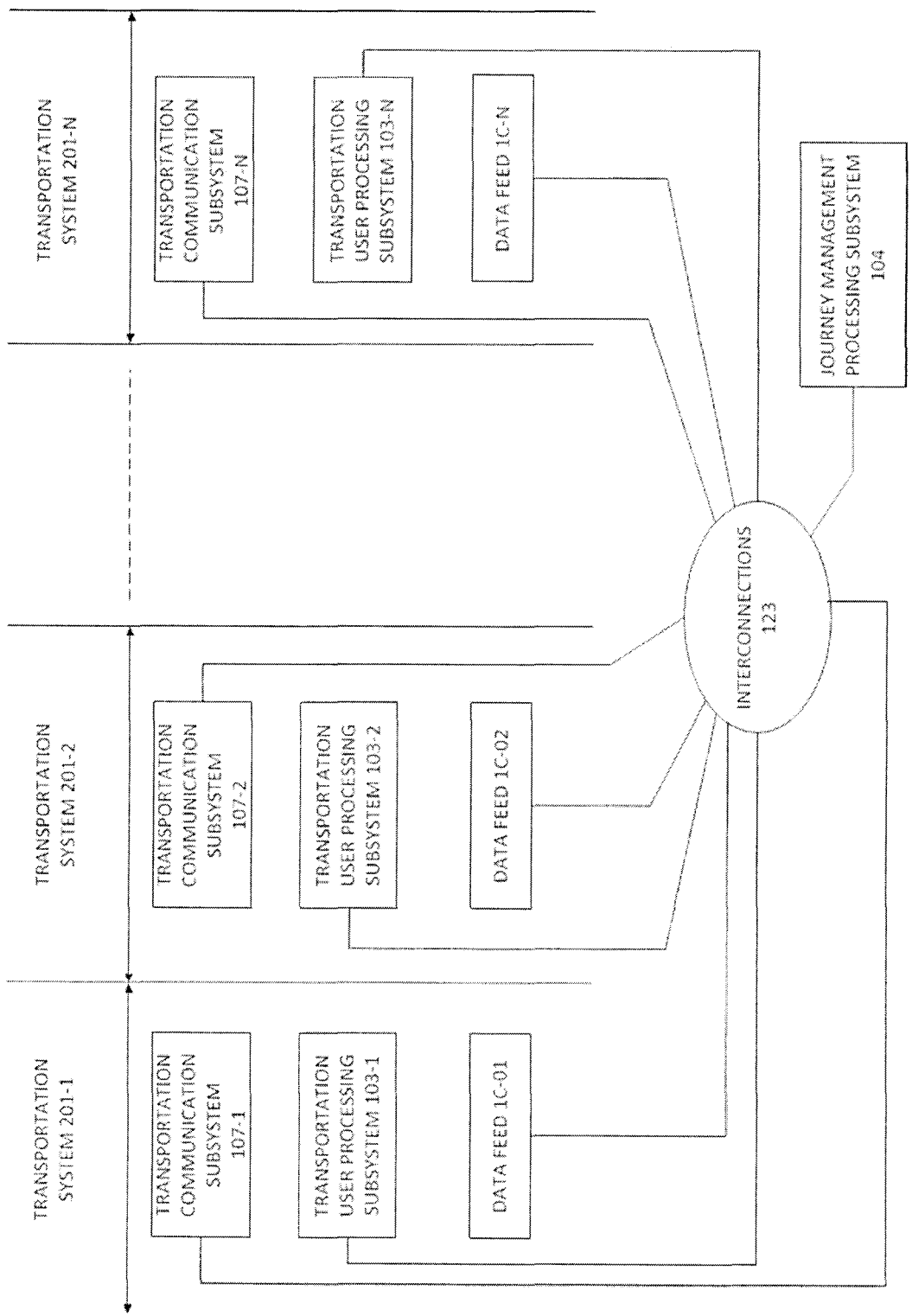
FIG. 1C is an illustration of several different transportation communication subsystems communicating with a journey management processing subsystem.

An example of the functioning of journey management processing subsystem 104 is shown in FIG. 1C. In some embodiments, as is shown in FIG. 1C, each transportation system has its own transportation communication subsystem and transportation user processing subsystem. For example:

transportation system 201-1 has transportation communication subsystem 107-1 and transportation user processing subsystem 103-1, transportation system 201-2 has transportation communication subsystem 107-2 and transportation user processing subsystem 103-2.

The transportation communication subsystems will be explained in further detail below.

Returning to FIG. 1C, these communication subsystems and user processing subsystems are coupled to each other and the journey management processing subsystem 104 via interconnections 123. In some embodiments, journey management processing subsystem 104 obtains scheduling and routing data from various transportation systems such as transportation system 201-1 to 201-N of FIG. 1C. This is performed using, for example, application programming interfaces (APIs). The APIs download data from each transportation system. In some embodiments, the transportation systems provide a feed of data. For example, as shown in FIG. 1C, transportation system 201-1 provides data feed 1C-01, transportation system 201-2 provides data feed 1C-02, and so on. In some embodiments, these data feeds are formatted according to a common format such as General Transit Feed Specification (GTFS). The data feed includes, for example:

Transportation system agency name, website, timezone and contact information;

Transportation system routes and related routing information;

Transportation system trips;

Transportation system stops, for example, train stations, streetcar/tram stops, bus stops;

Transportation system stop times; and

Calendars;

Then, journey management processing subsystem 104 uses the data provided by the data feeds and transportation user processing subsystems to assist the user in building a journey.

A variety of implementations are possible for journey management processing subsystem 104. In some embodiments, journey management processing subsystem 104 is implemented using a combination of hardware and software. In some other embodiments, a journey management processing subsystem 104 is implemented using one or more servers. In some embodiments, these servers are geographically distributed.

Hospitality and retail provider processing subsystem 105 in FIG. 1A enables user 101 to purchase, for example, food, drink and other retail purchases. In one embodiment, the application 102-4 running on user device 102 communicates with hospitality and retail provider processing subsystem 105 to make such purchases. Examples of this will be further detailed below. In some embodiments, user 101 uses application 102-4 to access one of transportation user processing subsystem 103-1 to 103-K to enable the use of a stored value card belonging to user 101 to make such purchases. In another embodiment, the application 102-4 running on user device 102 communicates with a payment processor such as Paysafe (see, for example, http://www.paysafe.com, retrieved Dec. 18, 2017) to accept payments from user 101.

A variety of implementations are possible for hospitality and retail provider processing subsystem 105. In some embodiments, hospitality and retail provider processing subsystem 105 is implemented using a combination of hardware and software. In some other embodiments, hospitality and retail provider processing subsystem 105 is implemented using one or more servers. In some embodiments, these servers are geographically distributed.

Transportation communication subsystems 107-1 to 107-N perform functions related to providing communications for users of a corresponding transportation system. In some embodiments, as explained previously and shown in FIG. 1C each transportation system has its own transportation communication subsystem.

Functionalities provided by the transportation communication subsystems include, for example,
  providing WiFi connectivity on vehicles associated with the transportation system and managing one or more WiFi connections, including, for example:
    providing carriage to carriage networks on trains,
    providing access points for users such as user 101, and maintaining a ground to train signal;
  providing onboard servers which are connected to a cache or a video on demand server to enable users to receive video on demand content and other content; and
  providing television and radio programs to users received via, for example, satellite receivers. Sources for these television and radio programs include providers such as the Canadian Broadcasting Corporation (CBC), British Broadcasting Corporation (BBC), Cable News Network (CNN), and so on.

As will be explained further below, in some embodiments, user device 102 connects via transportation communication subsystems 107-1 to 107-N and interconnections 123 to the components of framework 100 other than transportation communication subsystems 107-1 to 107-N.

Content distribution network (CDN) 113 of FIG. 1A performs the function of distributing services spatially relative to end-users such as user 101 to provide high availability and high performance. Content distribution network 113 provides services such as:
  Serving content such as
    web objects including, for example, text, graphics and scripts,
    downloadable objects including media files, software and documents,
    applications,
    live streaming media,
    on-demand streaming media, and
    social networks.
  web and mobile content acceleration, In some embodiments, CDN 113 comprises a geographically distributed network of proxy servers so as to provide high availability and high performance. These proxy servers are hosted by, for example, internet service providers (ISPs), telecommunication carriers and network operators. In some embodiments, proxy servers are located on vehicles such as buses, trains and streetcars or trams. In some of these embodiments, the application 104 looks for the closest proxy server to make a connection. In some embodiments, the proxy server connects to an advertising subsystem such as advertising collection and processing subsystem 117, so that the advertising subsystem is able to determine where the connection came from. In some embodiments, the proxy server caches data and information to enable rapid access by user devices.

In some embodiments, CDN 113 works together with transportation communication subsystems 107-1 to 107-N to perform functions.

Content provider processing subsystem 114 of FIG. 1A delivers content from providers which have signed up to provide content. This includes, for example:
  audio streams including, for example, radio and podcast programs,
  sports reports from sports data services providers such as SportRadar. These include, for example, sports tickers;
  weather reports,
  news networks,
  Local news providers,
  Video on demand from providers such as Netflix, and
  On demand television from providers such as Home Box Office (HBO) and Entertainment One (eOne).

In some embodiments, content provider processing subsystem 114 facilitates the provision of real time chat and video chat services.

In some embodiments, content provider processing subsystem 114 works together with transportation communication subsystems 107-1 to 107-N to perform functions.

A variety of implementations are possible for content provider processing subsystem 114. In some embodiments, content provider processing subsystem 114 is implemented using a combination of hardware and software. In some other embodiments, content provider processing subsystem 114 is implemented using one or more servers. In some embodiments, these servers are geographically distributed.

In some embodiments, user 101 is able to access content provided by content provider processing subsystem 114 using application 102-4. Examples will be presented further below.

Advertising collection and processing subsystem 117 performs the following functions:
  Serve advertisements and collect detailed statistics about user interaction including, for example, impressions, clicks and conversions;
  Managing campaigns for multiple advertisers and from advertising networks including, for example, providing an interface for interaction.
  Defining rules for delivery of campaigns and advertisements. This includes, for example, frequency capping, Uniform Resource Locator (URL) targeting and geo-targeting.

Tracking and reporting campaign performance and performing analytics including calculating metrics such as click-through rates, conversion rates, effective cost per mille (eCPM), basket value and number of items purchased.

In some embodiments, advertising collection and processing subsystem 117 runs programs such as Revive Adserver. More details about Revive Adserver can be found at, for example, https://www.revive-adserver.com/, retrieved Dec. 18, 2017.

In a further embodiment, advertising collection and processing subsystem 117 presents advertisements to user device 102 using application 102-4. This will be discussed in further detail below.

A variety of implementations are possible for advertising collection and processing subsystem 117. In some embodiments, advertising collection and processing subsystem 117 is implemented using a combination of hardware and software. In some other embodiments, advertising collection and processing subsystem 117 is implemented using one or more servers. In some embodiments, these servers are geographically distributed.

Location identification and tracking processing subsystem 119 performs the functions such as, for example:
Global Positioning Satellite (GPS) tracking of users such as user 101, including, for example, receiving GPS data from servers and serving data to user devices such as user device 102; and
Creating location-based data for users such as user 101 including
Obtaining all location records for users such as user 101,
Obtaining last location reading for users such as user 101, and
Creating location records for users such as user 101.

In a further embodiment, location identification and tracking processing subsystem 119 communicates with one or more mapping programs and services such as, for example, GOOGLE® Maps to enable user 101 to plan trips using user device 102 and application 102-4.

In some embodiments, location identification and tracking processing subsystem 119 works together with journey management processing subsystem 104 to, for example, assist a user to track the progress of a trip via a map displayed on application 102-4.

A variety of implementations are possible for location identification and tracking processing subsystem 119. In some embodiments, location identification and tracking processing subsystem 119 is implemented using a combination of hardware and software. In some other embodiments, location identification and tracking processing subsystem 119 is implemented using one or more servers. In some embodiments, these servers are geographically distributed.

Context processing subsystem 121 performs functions related to determining one or more contexts associated with user devices such as user device 102. In general, the context of an entity is information describing the past environment; present environment; or the past and present environments surrounding the entity in the digital and physical worlds. Then the context of a user device such as user device 102 is information describing the past environment; present environment; or the past and present environments surrounding user device 102 in the digital and physical worlds.

In some embodiments, the context of a user device additionally comprises the context of the one or more users who utilize the device. For example, in some embodiments, the context of user device 102 comprises the context of user 101. The context of a user such as user 101 is information describing the past environment; present environment; or the past and present environments surrounding user 101 in the digital and physical worlds. This encompasses information such as user 101 location, time of day, time of year, season, user 101 motion, user 101 search history, weather experienced by user 101, loyalty programs that user 101 is part of, past history of user 101, past interaction history of user 101 with a particular vendor, relationship with user device 102, whether the device is fixed or mobile, browsing history of user 101, video and audio stream viewing history of user 101, email reading history of user 101, network connection history of user 101 and so on. Therefore, context can provide deep insights into what user 101 may want to do, see, hear, purchase, browse, and so on. In some embodiments, user 101 and user device 102 has more than one context.

Figure 1D:
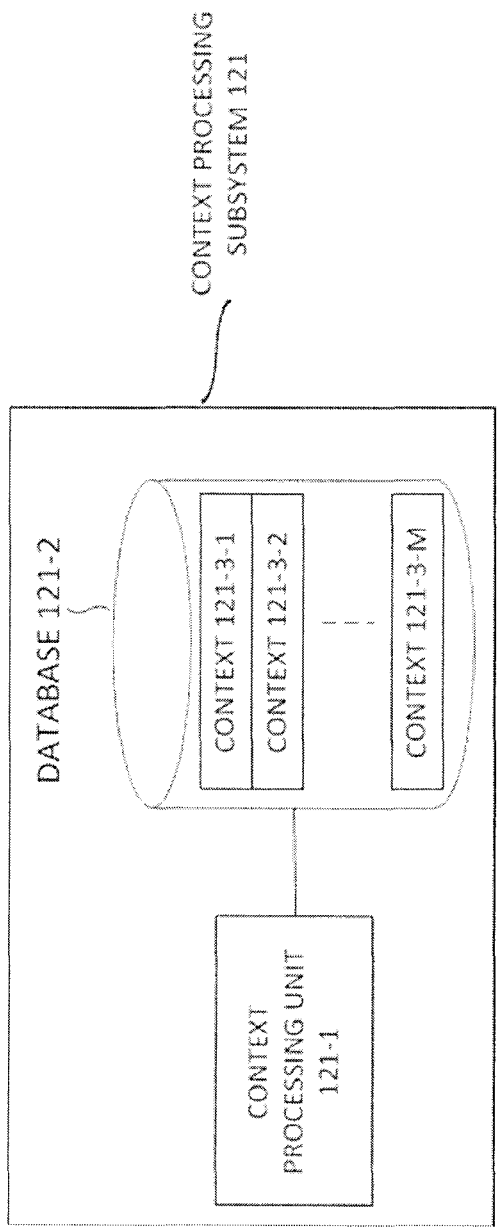
FIG. 1D is an illustration of an embodiment of a context processing subsystem.

An embodiment of context processing subsystem 121 is provided in FIG. 1D. In FIG. 1D, context processing subsystem 121 comprises context processing unit 121-1 and database 121-2. Context processing unit 121-1 performs the functions necessary to determine one or more contexts of user 101 and user device 102. It does these by, for example, acquiring data from the other components of FIG. 1 such as transportation communication subsystems 107-1 to 107-N, content provider processing subsystem 114, advertising collection and processing subsystem 117 and location identification and tracking processing subsystem 119. As will be explained below, in some embodiments, context processing unit 121-1 determines contexts based on a combination of environmental factors. In some embodiments, context processing unit 121-1 determines context together with the other components of framework 100, for example, based on data received from the other components of framework 100.

As shown in FIG. 1D, context processing unit 121-1 is coupled to database 121-2. Database 121-2 stores context corresponding to each user. For example, with reference to FIG. 1D, context 121-3-1 corresponds to one user, context 121-3-2 corresponds to a different user, and so on until context 121-3-M. Then, after context processing unit 121-1 determines a context corresponding to a user such as user 101 and user device 102, this context is stored in database 121-2.

In some embodiments, after context processing unit 121-1 determines the context of user 101 and user device 102, this context data is communicated via interconnections 123 to the other components of framework 100 and user device 102. Based on the determination of the context of the user 101 and user device 102 performed by context processing subsystem 121, actions are performed by the appropriate components of framework 100 for application 102-4 running on the user device 102. Examples of actions performed include:
the sponsored transportation system, and the region the user is located in, is determined;
services are performed for user 101 via application 102-4 running on user device 102;
content is then made available to user 101 via application 102-4 running on user device 102 by, for example CDN 113 and content provider processing subsystem 114;
advertising and marketing campaigns targeted to user 101 are carried out via application 102-4 running on user device 102 by, for example, advertising collection and processing subsystem 117;
advertising revenue attribution is performed by, for example, advertising collection and processing subsystem 117;

bandwidth restrictions are set by, for example, the transportation communication subsystem that user device 102 is connected to;

application 102-4 themes are determined;

service alerts are delivered to application 102-4;

fare portions are deducted by the appropriate transportation user processing subsystems; and locally customized news such as weather is delivered by, for example, content provider processing subsystem 114.

Figure 2A:
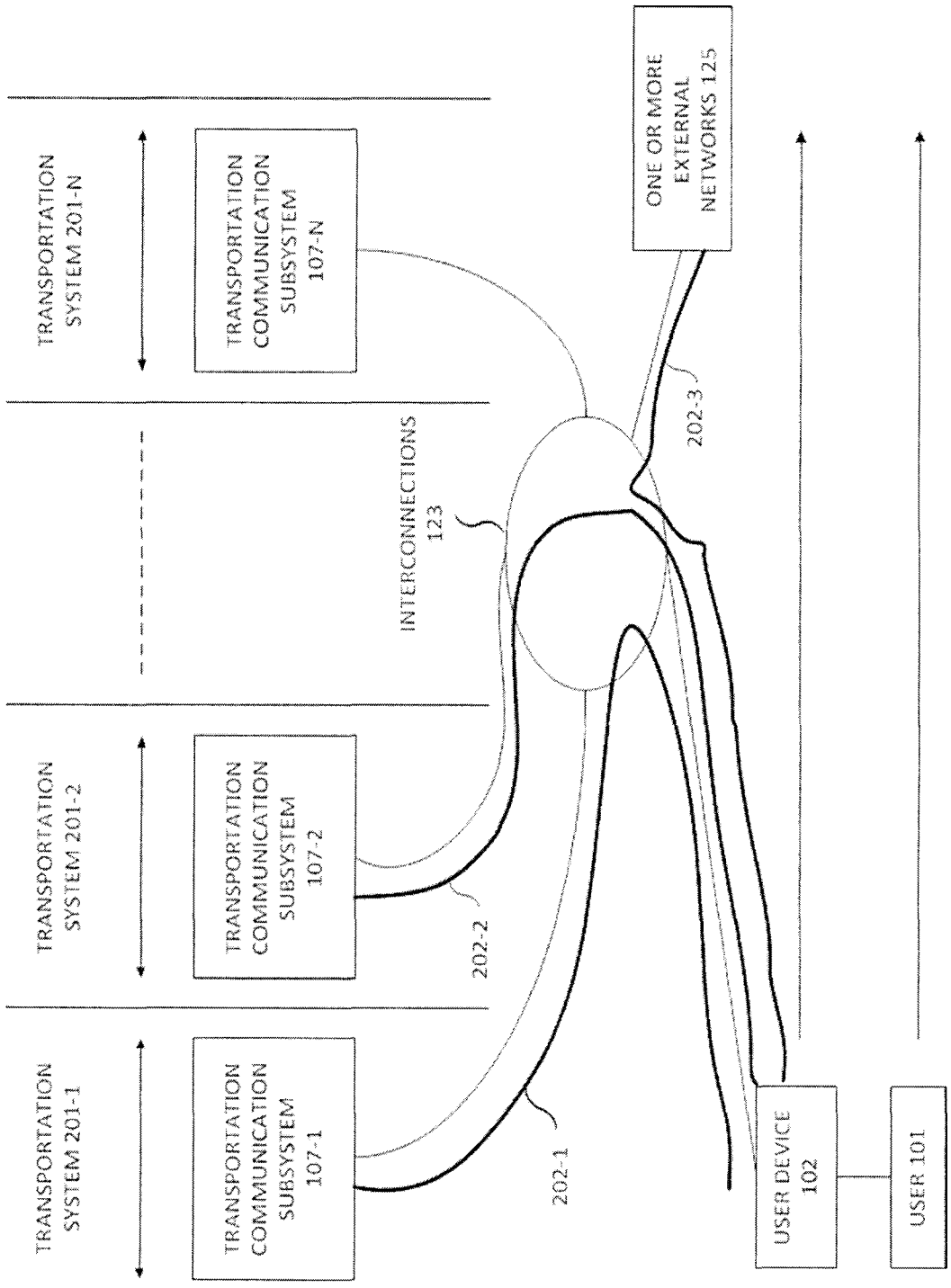
FIG. 2A is an illustration of a user connecting to different transportation communication subsystems and one or more external networks.
Figure 2B:
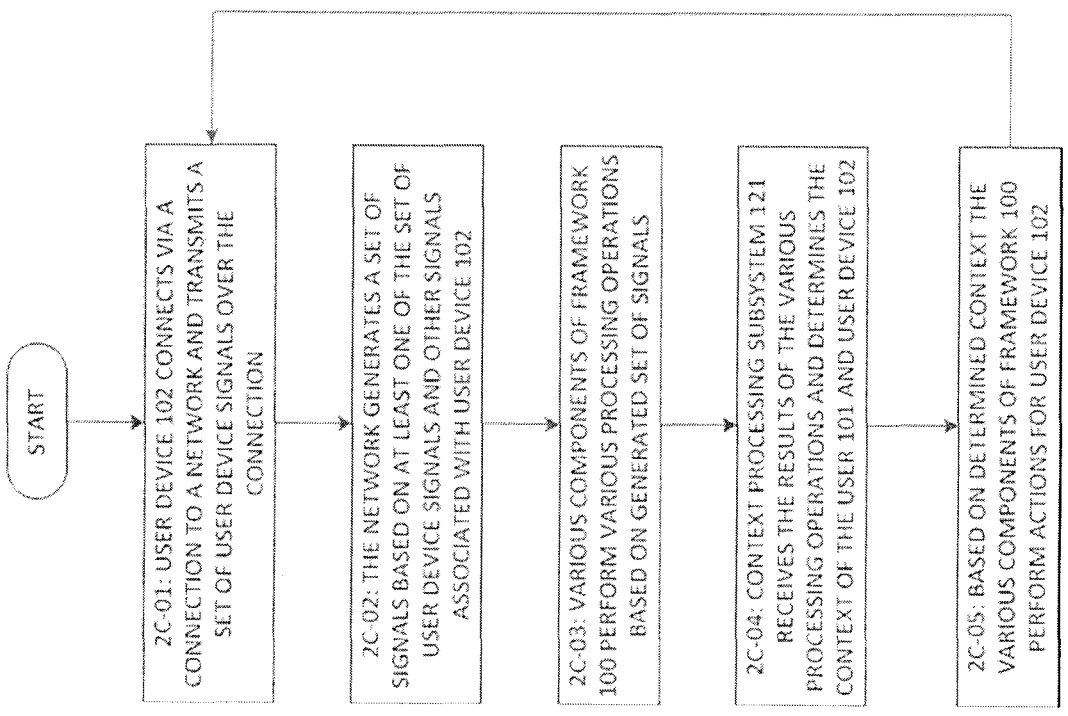
FIG. 2B is an illustration of a process to determine context, and based on the determined context, deliver content and perform services accordingly.

In one embodiment, context determination is automatically performed. An example of automatic determination is shown in FIGS. 2A and 2B. In FIG. 2A, user 101 and user device 102 are moving through transportation system 201-1 to 201-N via system 201-2. In step 2C-01 of FIG. 2B, user device 102 connects to a transportation communication subsystem via a connection routed over interconnections 123 and transmits a set of user device signals via this connection. For example, when user device 102 is in transportation system 201-1, it connects to transportation communication subsystem 107-1 via connection 202-1, which is routed over interconnections 123. User device 102 then continually transmits a set of user device signals via connection 202-1. In some embodiments, the user device signals are transmitted by application 102-4 running on user device 102. In addition to user device signals, in some embodiments, other signals associated with user device 102 are also transmitted. The user device signals comprise, for example, data transmitted as a result of user 101 interaction with user device 102 and application 102-4 such as user logins;

data indicating which network user device 102 is connected to;

data indicating which content is being used by the user;

Internet Protocol (IP) Address;

identifying information for user device 102 such as Service Set Identifier (SSID);

service requests transmitted to framework 100 from application 102-4, including for example:

requests for trip or journey planning, and requests for user content location-identifying information such as GPS coordinates; and date and time.

In step 2C-02 the network or transportation communication subsystem connected to user device 102 generates a set of signals based on at least one of the set of user device signals and other signals associated with user device 102. This generated set of signals is then acquired by the various components of FIG. 1 via interconnections 123. For example, transportation communication subsystem 107-1 generates a first set of signals based on at least one of the set of user device signals and other signals associated with user device 102 in transportation communication subsystem 107-1. Then the various components of FIG. 1 acquire this first set of signals via interconnections 123. In one embodiment, this acquisition occurs via a "push" process, that is, transportation communication subsystem 107-1 transmits the first set of signals to the various components of FIG. 1 without prompting. In another embodiment, this acquisition occurs via a "pull" fashion i.e. transportation communication subsystem 107-1 transmits the first set of signals to the other components in FIG. 1 when prompted.

In step 2C-03, the various components of FIG. 1 perform various processing operations based on the generated first set of signals. For example, with reference to the example above, location identification and tracking subsystem 119 acquires the generated first set of signals via interconnections 123. Then, location identification and tracking subsystem 119 identifies the location of user device 102 and user 101 based on the acquired first set of signals. The results of these processing operations are transmitted to the other components via interconnections 123.

In step 2C-04, the context processing subsystem 121 receives the results of the various processing operations performed in step 2C-03, and uses these results to determine the context of user 101 and user device 102. Based on the results, the context of user 101 and user device 102 are updated if necessary. The results of the context determination are made available by context processing subsystem 121 to the components of FIG. 1 via interconnections 123.

Based on the determined context in step 2C-04, in some embodiments in step 2C-05 the various components of FIG. 1 perform actions as explained above. In some embodiments, as part of these actions, services are performed for the user. For example, journey management processing subsystem 104 delivers a service alert to application 102-4 running on user device 102 based on the determined context. As explained above, advertising collection and processing subsystem 117 presents advertisements to user device 102 using application 102-4. In some embodiments, these advertisements are personalized and targeted based on user and user device contexts. For example, if the user 101 is travelling to a Toronto Blue Jays game at Rogers Centre, then advertisements for businesses along the user route are delivered. In some embodiments, these services are performed for other parties such as transportation system providers. For example, if the user 101 is travelling through transportation systems 201-1 to 201-N on a single ticket, then in transportation system 201-1, transportation user processing subsystem 103-1 determines the portion of the fare consumed when travelling through transportation system 201-1, and deducts this portion of the fare from the ticket. While the user is in transportation system 201-1, advertising collection and processing subsystem 117 attributes a first revenue amount connected to advertising consumed by the user 101 via user device 102 to transportation system 201-1. In some embodiments, the various components in FIG. 1 deliver content to user device 102.

Steps 2C-01 to 2C-05 are then continually repeated.

Another example is as follows: When user device 102 and user 101 exits transportation system 201-1 and enters transportation system 201-2, steps 2C-01 to 2C-04 are performed with the following changes:

In step 2C-01, user device 102 connects to transportation communication subsystem 107-2 via connection 202-2 which is also routed over interconnections 123. Application 102-4 running on user device 102 then continually transmits a set of user device signals via connection 202-2.

In step 2C-02 transportation communication subsystem 107-2 then generates a second set of signals based on the set of user device signals transmitted by user device 102 over connection 202-2.

Steps 2C-03 to 2C-05 are repeated based on this second set of signals. For example, with specific reference to entry into transportation system 201-2:

If user 101 was viewing a specific video on demand via connection 202-1, then based on the user device signals and the first set of signals generated by transportation communication subsystem 107-1, the relevant components of framework 100 such as content provider processing subsystem 114 are able to identify the video watched and the amount of time elapsed.

When the user 101 switches to transportation system 201-2 then based on the second set of signals generated by transportation communication subsystem 107-2, the specific video is cached and made available by content provider processing subsystem 114 for the user to resume watching the video over connection 202-2. In some embodiments, the user resumes watching from the elapsed time corresponding to the user exiting transportation system 201-1;

If the user 101 is embarking on a journey where user 101 is travelling through transportation systems 201-1 to 201-N on a single ticket, in transportation system 201-2 a second portion of the fare related to the ticket is deducted based on the second set of signals generated by transportation communication subsystem 107-2; and In transportation system 201-2 advertising collection and processing subsystem 117 attributes a second revenue amount connected to advertising consumed by the user 101 via user device 102 based on the second set of signals generated by transportation communication subsystem 107-2.

The process above is performed for every transportation system that user device 102 and user 101 enters.

In some embodiments, there are one or more networks which are external to framework 100, and are different from the transportation communication subsystems provided by transportation systems 201-1 to 201-N. These one or more external networks 125 are connected to framework 100 and user device 102 via interconnections 123 shown in FIG. 1. In some embodiments, user device 102 couples to framework 100 via these one or more external networks 125 and interconnections 123.

An example of this is shown in FIG. 2A: User device 102 connects to one or more external networks 125 via connection 202-3 which is routed over interconnections 123. User device 102 then continually transmits a set of signals via connection 202-3 to one or more external networks 125. The process outlined above in steps 2C-01 to 2C-05 is still performed with one or more external networks 125 used in place of transportation communication subsystems 107-1 to 107-N. However, when the context determination is performed, it is different from the situation above due to the connection running through one or more external networks 125. Then, in some embodiments, based on this different context, the services performed and content delivered are changed compared to the previous situation due to the fact that the transportation communication subsystems 107-1 to 107-N are not used. For example, Some content is not delivered or made available to the user device 102, and Some services are not performed by the components of FIG. 1.

Figure 2C:
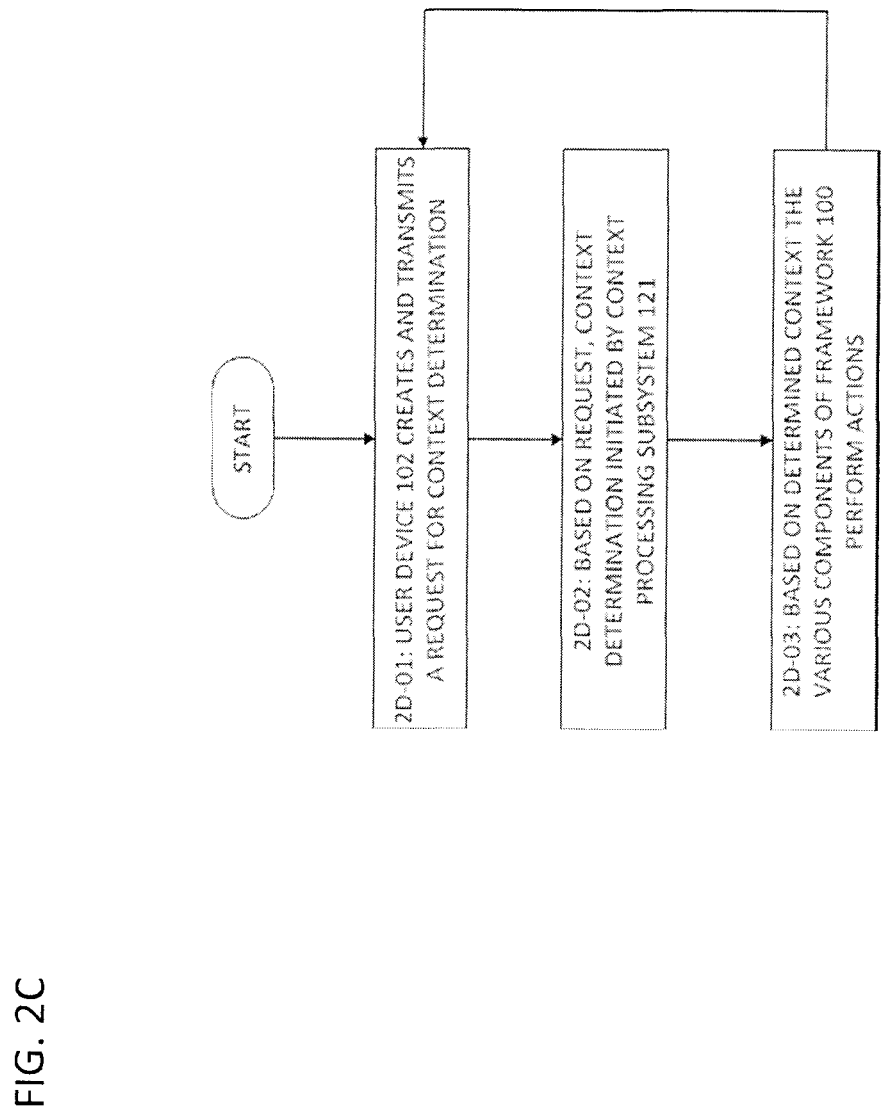
FIG. 2C is an illustration of an alternative process to determine context.

FIG. 2C shows another embodiment for context determination. In step 2D-01, user device 102 creates a request and transmits the request via a connection routed over interconnections 123. In further embodiments, the application 102-4 running on user device 102 creates a request for context processing subsystem 121 to determine if context has changed. This is performed if, for example:

The user device 102 is disconnected from its current Service Set Identifier (SSID), for example when it disconnects from one of transportation communication subsystems 107-1 to 107-N;

The user device 102 joins a new SSID, when, for example, it connects to a new one of transportation communication subsystems 107-1 to 107-N; or Periodic checks are performed to see if the context has changed. For example, the application 102-4 is set to periodically check if context has changed to ensure context integrity.

In some embodiments, the request comprises the current Service Set Identifier (SSID) and auxiliary data necessary to ensure the request is fulfilled. In some embodiments, the current SSID corresponds to the transportation communication subsystem that user device 102 is currently connected to.

In some embodiments, the auxiliary data comprises, for example

IP Address;

location-identifying information such as GPS coordinates; and date and time.

As previously explained, in some embodiments the request is created by user device 102 to determine if context has changed. Also as previously explained, the request comprises the current SSID and auxiliary data such as:

IP Address;

location-identifying information such as GPS coordinates; and date and time.

In step 2D-02, based on the request received from user device 102, as explained previously context is determined by context processing unit 121-1. In some embodiments, context processing unit 121-1 works with the other components of framework 100 to determine context. For example, context processing unit 121-1 may work with location identifying and tracking subsystem 119 and journey management processing subsystem 104 to determine context.

In step 2D-03, the determined context is communicated via interconnections 123 to the other components of framework 100 and user device 102. Then actions are performed by the appropriate components of framework 100. Examples of these actions have been detailed previously. In some embodiments, in response to application 102-4 initiating a request for context determination, the context processing subsystem 121 sends back information comprising, for example:

data regarding the theme of the application 102-4 to be presented to the user 101; and links to libraries of resources available for logos and content libraries;

By supplying links to libraries of resources available, the files within the libraries can be stored at one or more proxy servers which form part of CDN 113 and retrieved as needed. This potentially reduces workload on back end servers and improves response time.

Application 102-4 of FIG. 1A will now be discussed in detail. In some embodiments, application 102-4 is made available to a user such as user 101 via an application store or marketplace such as GOOGLE® PLAY® store or the APPLE APP STORE®. The user 101 then downloads application 102-4 from the application store or marketplace.

Figure 3A:
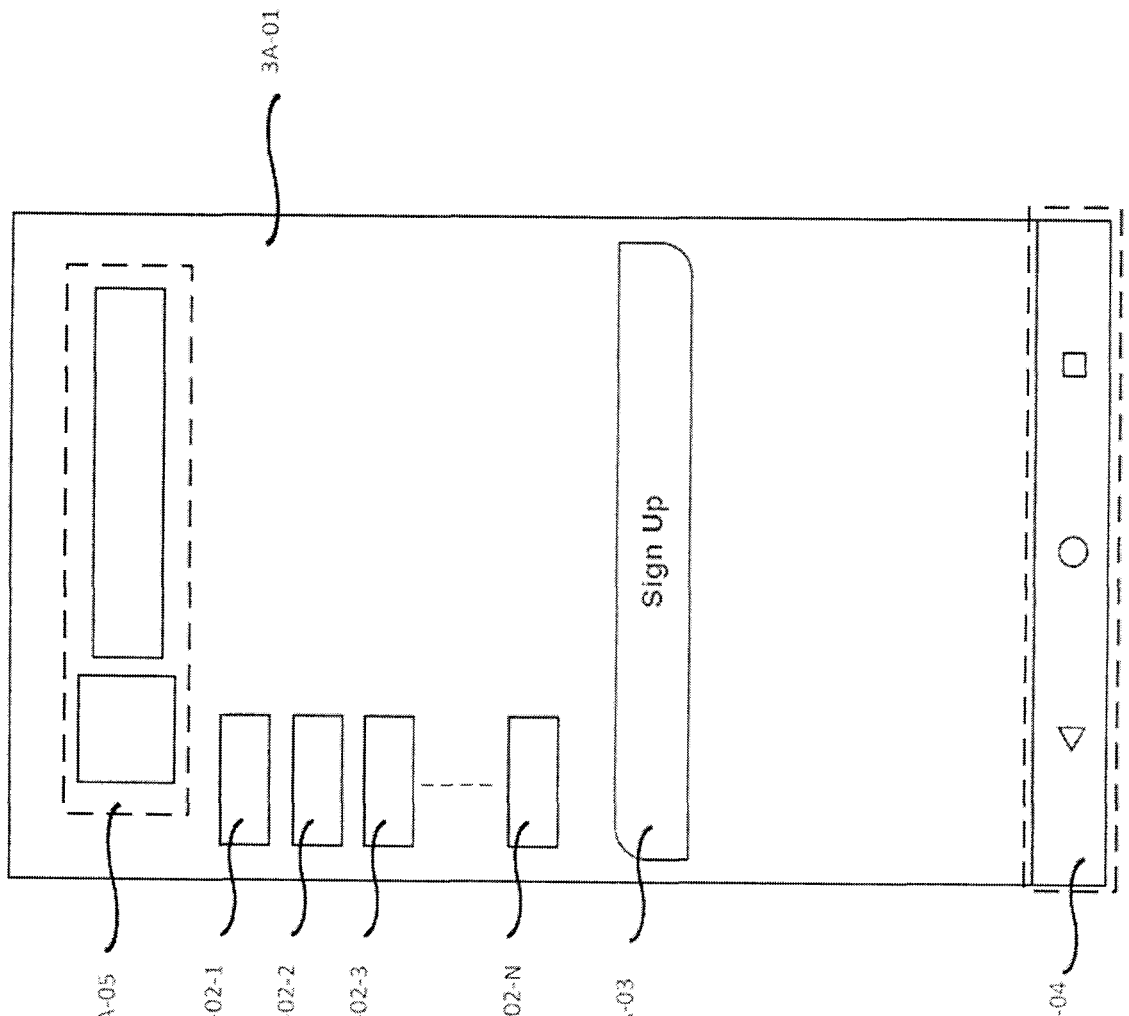
FIG. 3A shows an example registration screen for the application to access the framework.

Once this is complete, the user then registers or signs up to become a user of framework 100 from application 102-4. An example of a registration screen or interface 3A-01 to achieve this is shown in FIG. 3A. In FIG. 3A, interface 3A-01 comprises one or more areas 3A-02-1 to 3A-02-N to enter user details, such as name, email address, preferred password, gender, address and so on. Once this is complete, user 101 completes the registration process by activating signup or register button 3A-03 via, for example, pressing on the button 3A-03. Controls 3A-04 enables the user to move around within application 102-4. Furthermore, screen 3A-01 and the screens detailed below have associated appearances. In some embodiments, each appearance comprises a corresponding theme. The theme comprises, for example, icons and colours. Then in some embodiments, the theme is customized to the context determined by the context processing subsystem 121. For example, area 3A-05 is used for icons related to the transportation system that the user is travelling in. These icons include features such as, for example, transportation system logo and name. In some embodiments, the colours used match the colours of the transportation system.

Figure 3B:
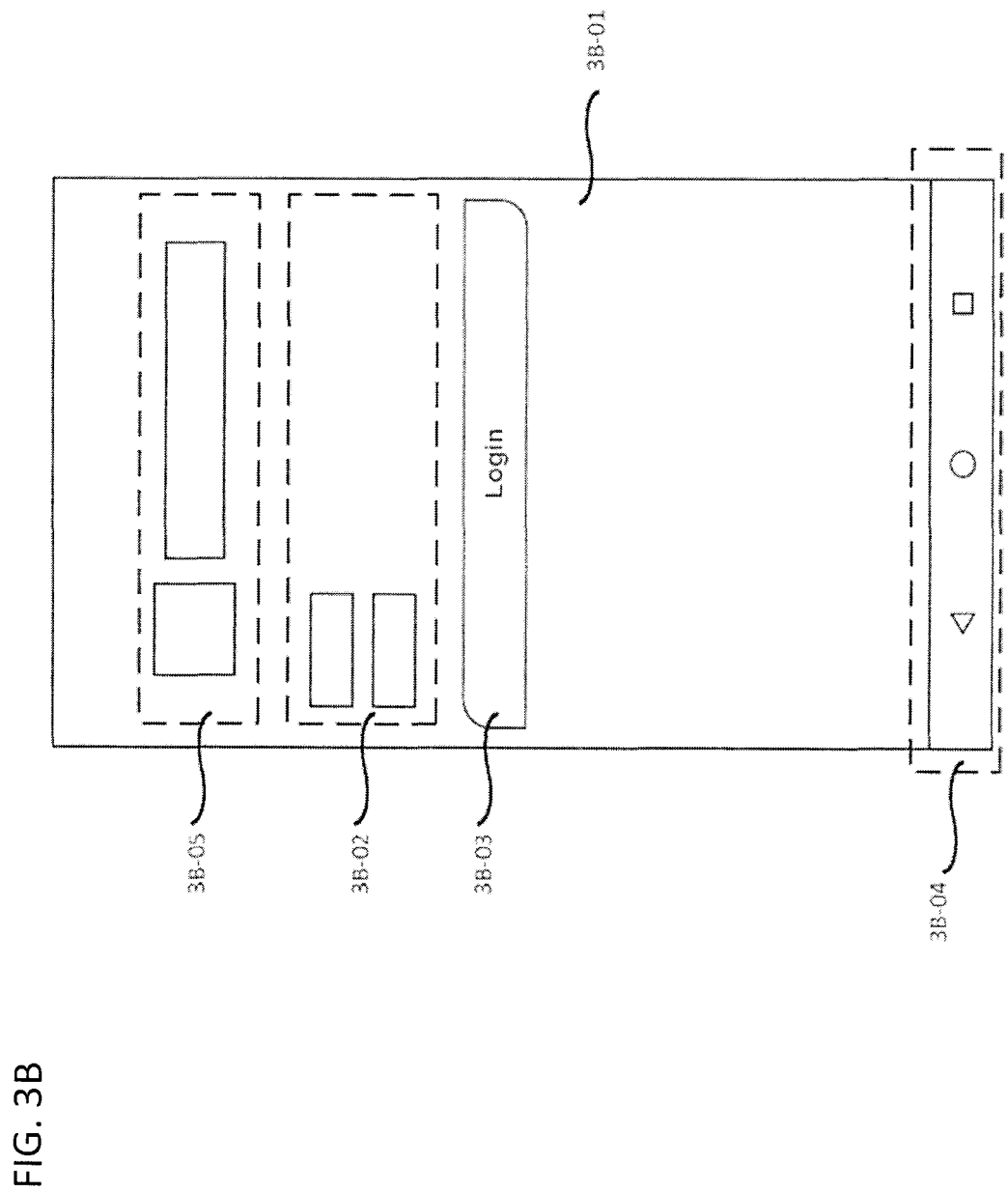
FIG. 3B shows an example login screen for the application to access the framework.

After this process is completed, the user 101 logs in to use the framework 100 using a login screen as shown in FIG. 3B. In FIG. 3B, login screen 3B-01 comprises one or more login areas 3B-02-1 to 3B-02-N to enter login details including user identification and authentication information including, for example, user name or email and password. Once this is complete, the user 101 activates login button 3B-03. If the user wishes to move around within the app, the user does so using controls 3B-04. Area 3B-05 is used for decorative icons such as, for example, transportation system logo and name.

Additionally, as explained previously, some services are restricted and some content is not made available when a user is coupled to framework 100 via one or more external networks 125. In some embodiments, the application 102-4 restricts access of user 101 and user device 102 when user 101 is on one or more external networks 125 by not presenting a full screen, and a warning.

Figure 4A:
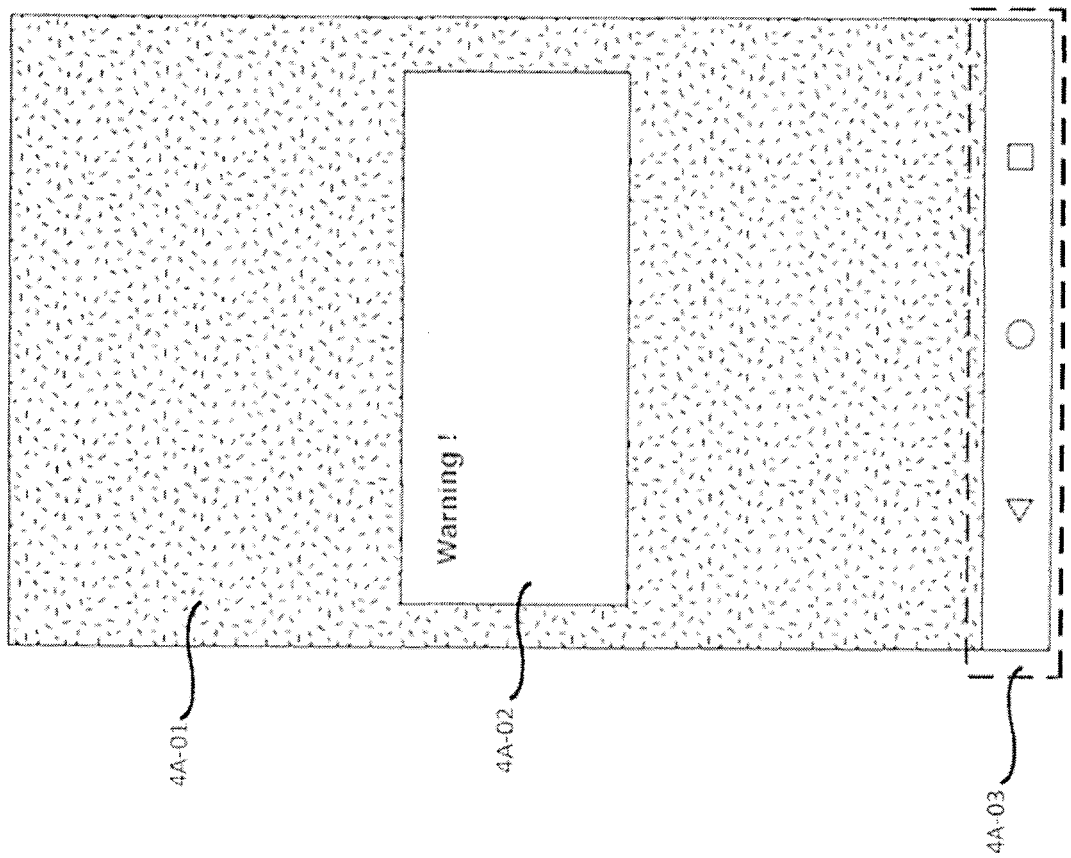
FIG. 4A shows an example of the application not presenting a full screen and a warning when the user device is connected to one or more external networks.

An example embodiment of this is shown in FIG. 4A. In FIG. 4A, overlay 4A-01 is generated by application 102-4. Overlay 4A-01 restricts access of user 101. In some embodiments, overlay 4A-01 is translucent. In others, it is opaque. Furthermore warning 4A-02 is also presented. Warning 4A-02 comprises, for example, text to warn the user that in order for the user to access restricted services and content, the user must be connected to a transportation communication subsystem such as transportation communication subsystem 107-1 of FIG. 2B. In some embodiments, warning 4A-02 also comprises a button to close the warning if necessary. Controls 4A-03 enable the user to move around the application 102-4 to, for example, access non-restricted content and services.

Restricting the access of the user 101 when user 101 is connected via an external network 125 has the effect of making the user 101 reluctant to leave the application 102-4. As explained above, increasing the difficulty for user 101 to leave the application has the effect of making application 102-4 more valuable as an advertising channel for advertisers. It also assists context processing subsystem 121 in increasing the accuracy of determining the context associated with user 101. It also allows more data related to users to be recorded and provided to transportation system providers, so as to improve accuracy of prediction and thereby improve planning.

Figure 4B:
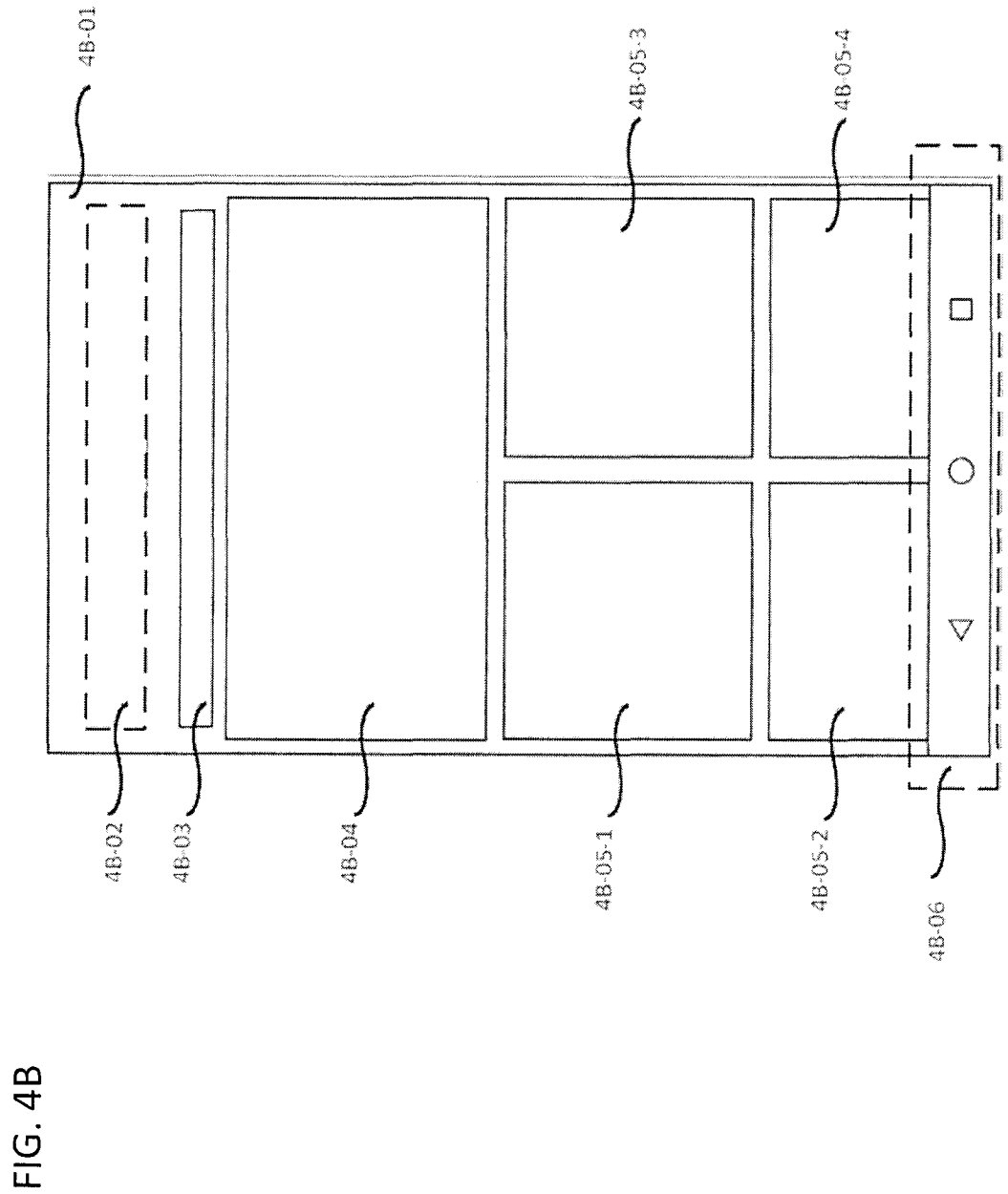
FIG. 4B shows an example of the application presenting a full screen.

When the user device 102 connects to one of transportation communication subsystems 107-1 to 107-N, the application 102-4 presents a full screen home page to the user. An example embodiment of a home page 4B-01 is shown in FIG. 4B. In home page 4B-01, top area 4B-02 includes, for example, buttons to show settings, notifications and transportation system logo and name. Menu 4B-03 allows the user 101 to navigate within the application 102-4 by selecting items within menu 4B-03. Area 4B-04 presents, for example, most recent additions or service updates. Users are also able to see other information such as trip progress, rates and schedules, news headlines in areas 4B-05-1 to 4B-05-4. Controls 4B-06 enable the user to move around the application 102-4 as necessary.

Figure 5A:
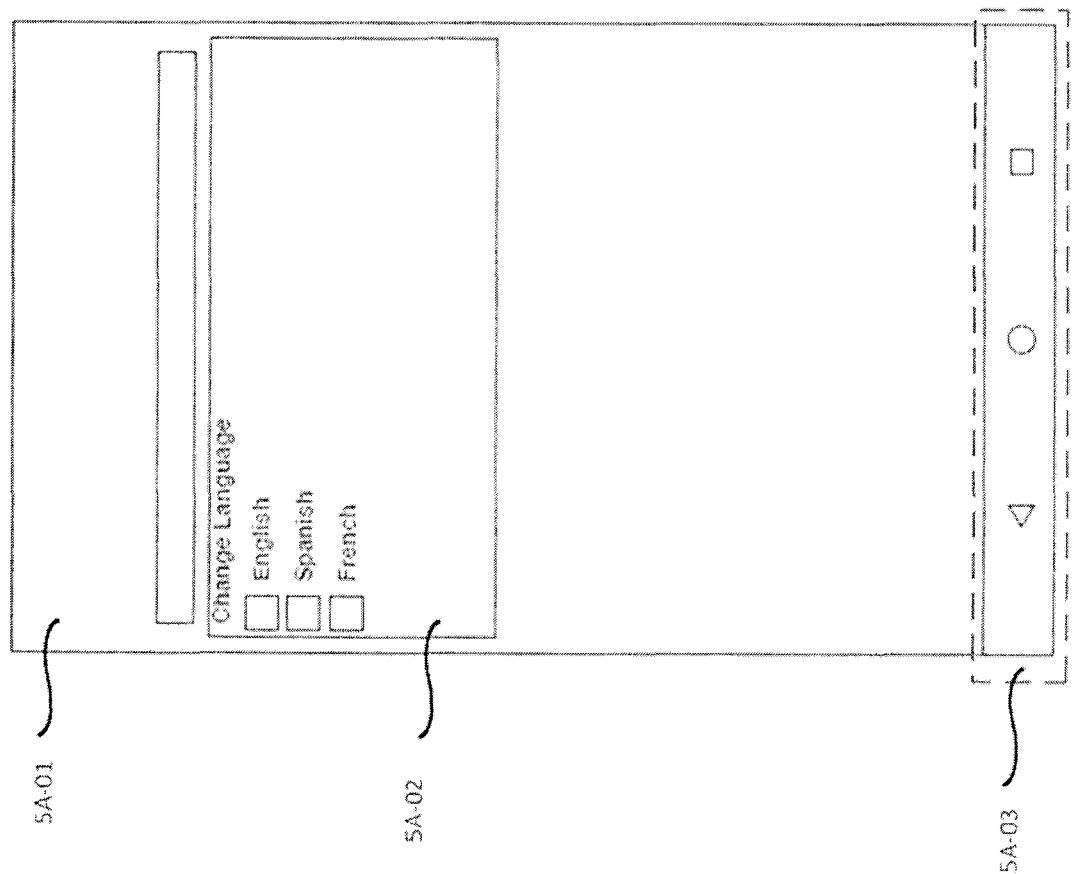
FIG. 5A shows an example embodiment of a settings screen.

Users are also able to customize the settings of application 102-4 to their liking. In one embodiment, user 101 customizes the settings of application 102-4 on user device 102 via a settings screen. An example embodiment of such a settings screen 5A-01 is shown in FIG. 5A. In screen 5A-01, user 101 customizes settings in area 5A-02. An example of such a setting is language, as shown in FIG. 5A. Examples of other settings include choice of displaying a sports ticker, choosing language settings, choosing between kilometres and miles and so on. Controls 5A-03 enable the user to move around the application 102-4 as necessary.

Figure 6A:
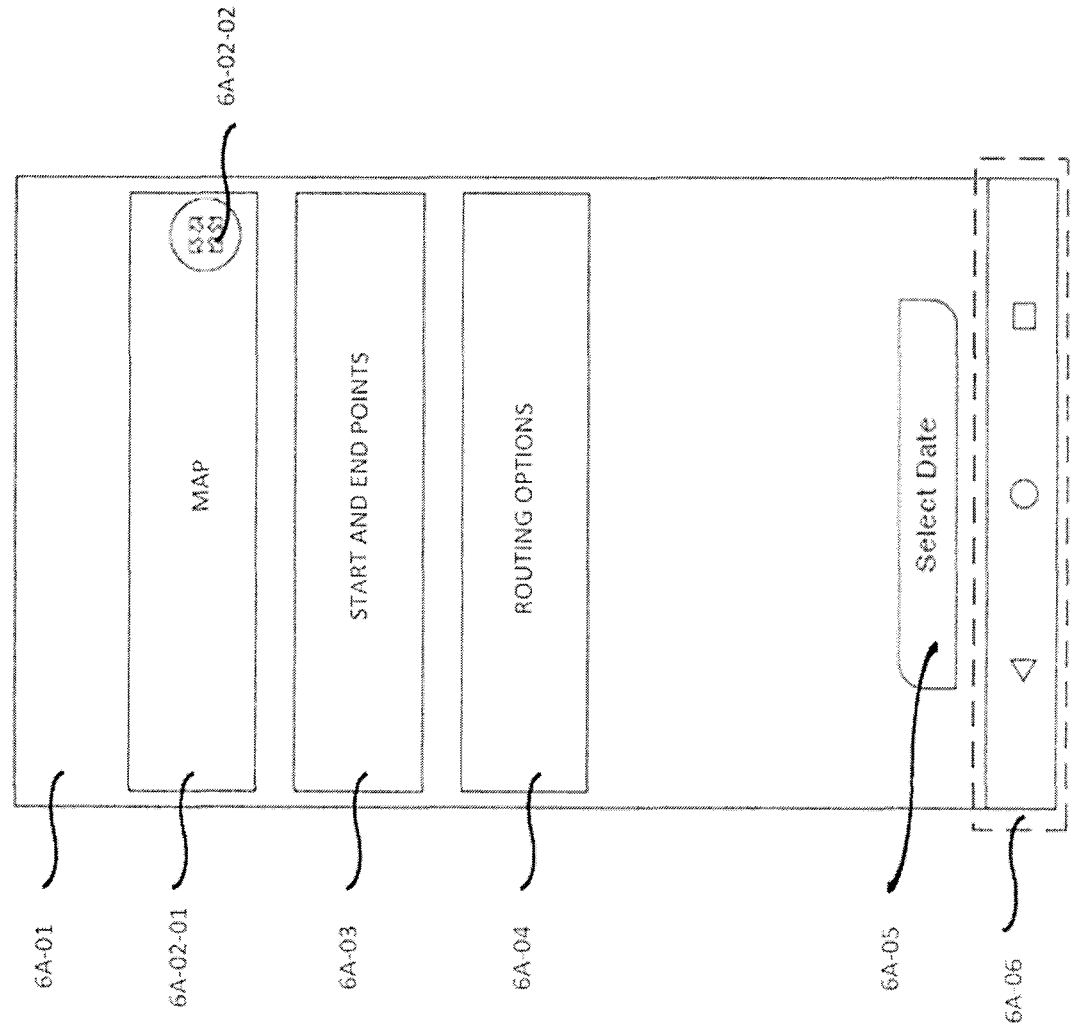
FIGS. 6A-6D shows example embodiments of screens for planning a journey.

As explained previously, user 101 is able to plan journeys by accessing journey management processing subsystem 104 using application 102-4. FIGS. 6A to 6D shows example embodiments of screens for planning a journey. In FIG. 6A, interface 6A-01 is presented to allow the user 101 to plan a journey. The user 101 enters the starting point and end point in area 6A-03. In area 6A-04 the user 101 selects a routing option based on criteria which best suits their needs. Example routing options include lowest price, fastest route, most comfortable, route with least transfers, and routes which use a transportation system of the user's choice. Button 6A-05 allows user 101 to select a departure date and a departure time. Map 6A-02-01 allows the user to see the chosen trip. Resize button 6A-02-02 allows the user to size the map 6A-02-01 as necessary. In some embodiments, the map is provided by an external provider such as, for example, GOOGLE®. Controls 6A-06 enable the user to move around the application 102-4 as necessary.

Figure 6B:
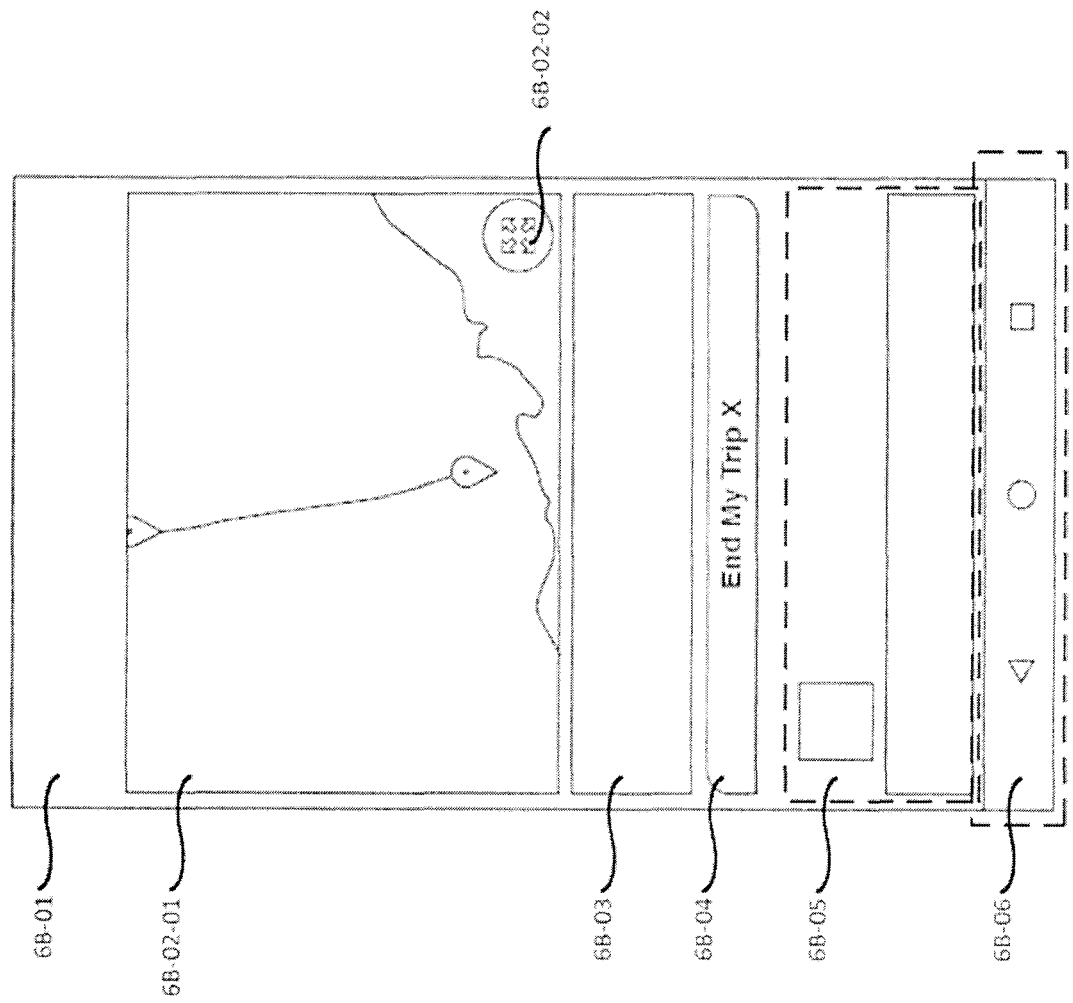
Figure 6C:
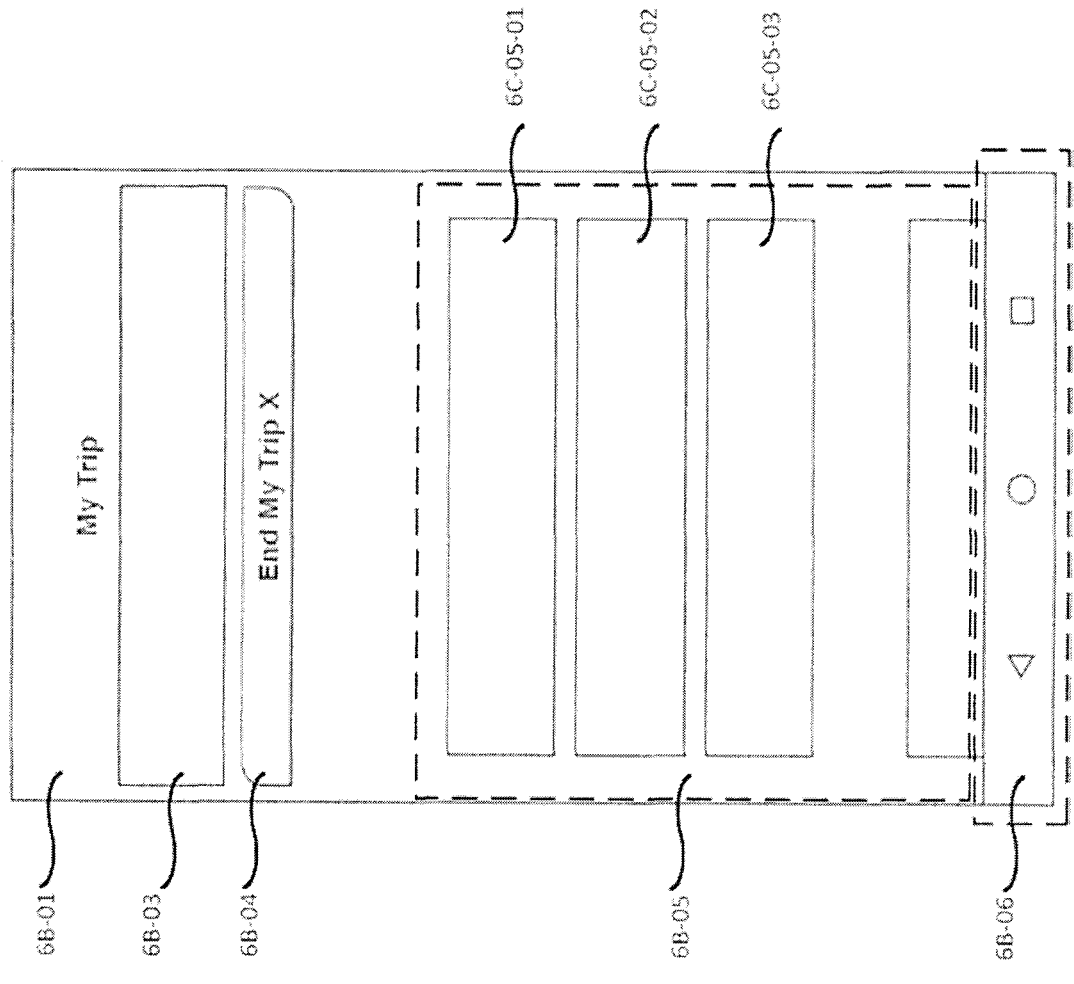

In FIGS. 6B and 6C application 102-4 presents detailed journey management information obtained from, for example, journey management processing subsystem 104. FIG. 6B shows an interface 6B-01. Map 6B-02-01 is a larger version of map 6A-02-01 presented in FIG. 6A. In some embodiments, map 6B-02-01 provides a visual depiction of the progress of the journey, based on information received from journey management processing subsystem 104. This includes, for example, journey start point, end point and current location. Resize button 6B-02-02 allows the user 101 to size the map as necessary. Area 6B-03 is used to, for example, display starting and end points of the journey as well as other information such as distance and time to complete the journey. Button 6B-04 allows the user to indicate when the journey has ended. Area 6B-05 displays each stage of the journey. In one embodiment, user 101 scrolls down to see more information about the journey in area 6B-05. Controls 6B-06 enables the user to move around the application 102-4 as necessary.

FIG. 6C is an example embodiment where the user has scrolled down with area 6B-05. 6B-01, 6B-03, 6B-04 and 6B-06 have been previously explained in relation to FIG. 6B. As explained previously, multiple stages 6C-05-01 to 6C-05-03 are shown in area 6B-05. In some embodiments, each of the multiple stages 6C-05-01 to 6C-05-03 represent portions of the overall journey. In some embodiments, each of the multiple stages 6B-05-01 to 6B-05-03 are associated with one or more transportation systems. This information is obtained from, for example, journey management processing subsystem 104.

Figure 6D:
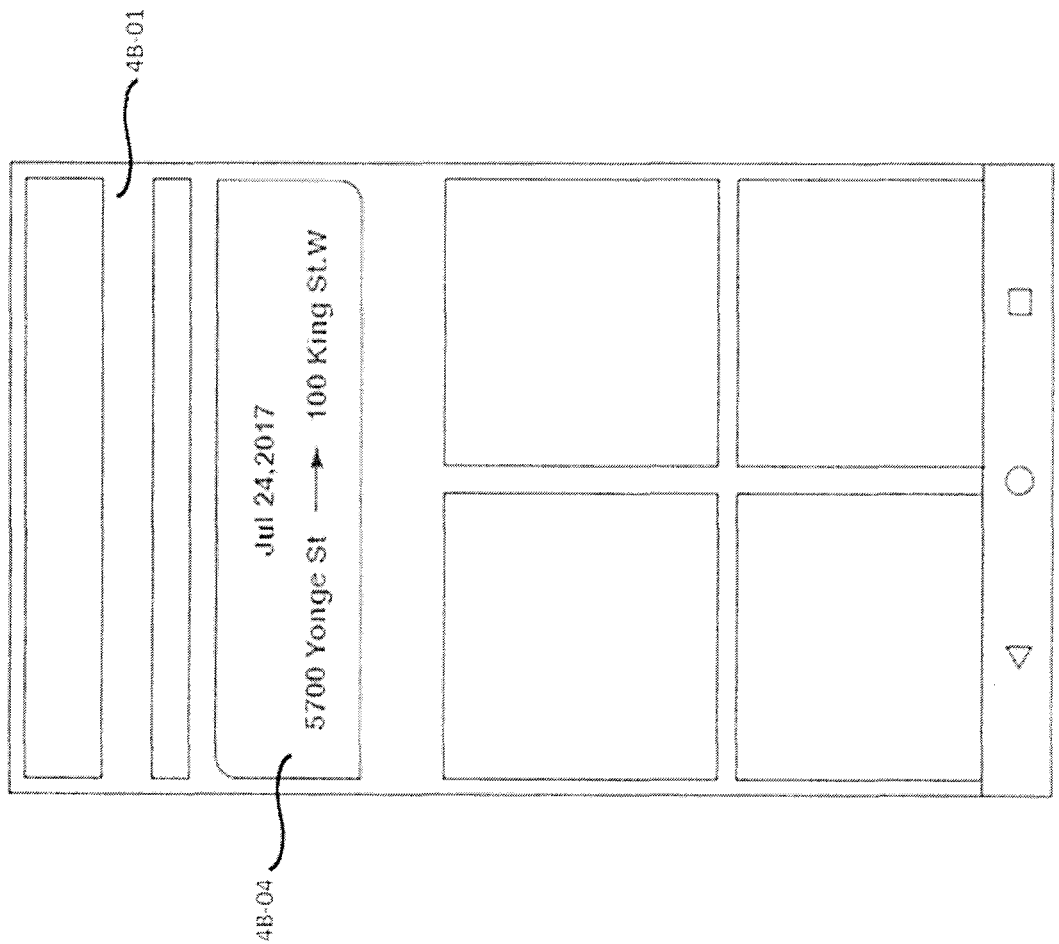

In FIG. 6D the home screen 4B-01 is presented, and in area 4B-04 updated journey information, departure times, arrival times and journey duration are also presented. As explained previously, as shown in FIGS. 6A and 6B in some embodiments application 102-4 interacts with other applications running on user device 102 to enable trip or journey planning and management. The information obtained via such interactions are then shown on the relevant interfaces or screens of application 102-4.

Users are also able to interact with transportation systems for loyalty points and rewards via application 102-4. As explained previously, in some embodiments, transportation user processing subsystem 103-1 to 103-K performs functions related to managing loyalty point and reward programs for user 101. Then, in some embodiments, application 102-4 interacts with transportation user processing subsystem 103-1 to 103-K to perform these functions.

Figure 7A:
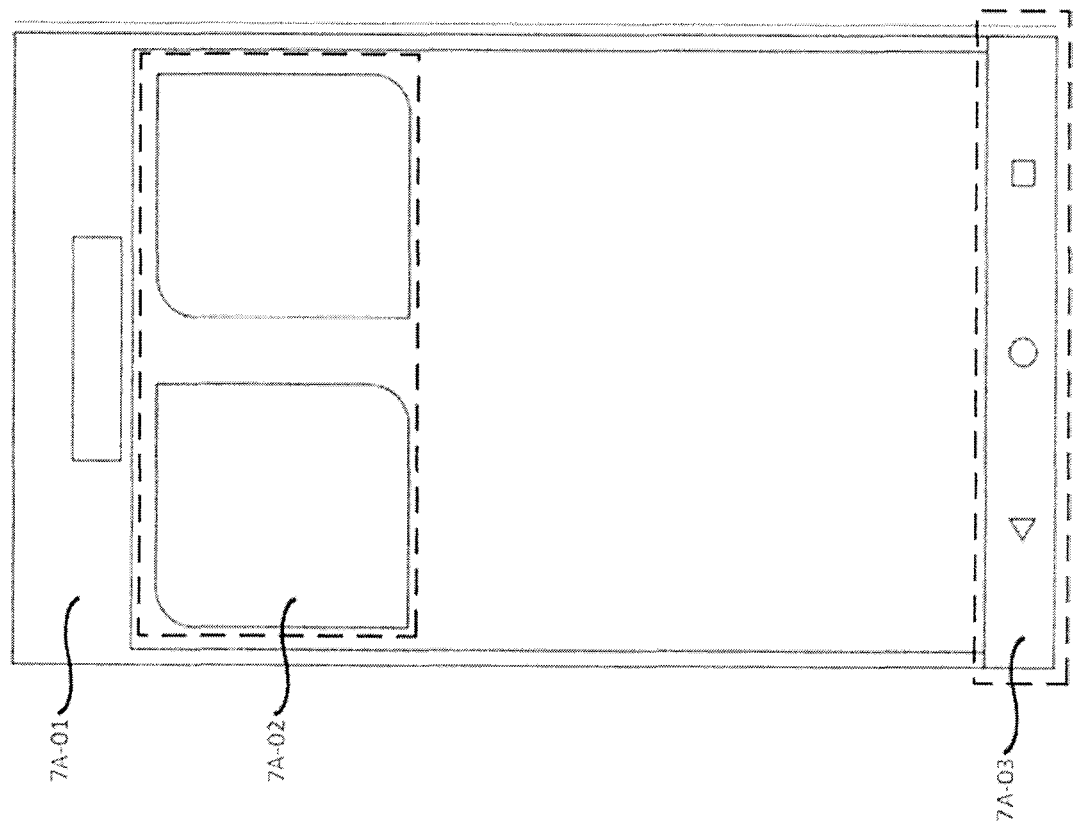
FIG. 7A shows an example embodiment of a screen to enable user interaction with loyalty points and/or rewards programs.

FIG. 7A shows one embodiment of a screen to enable this interaction. Screen 7A-01 shows rewards which have been obtained by user 101 in area 7A-02. In some embodiments, detailed information including total rewards obtained, rewards used and individual rewards given; and associated dates are shown in area 7A-02. Controls 7A-03 enables the user to move around the application 102-4 as necessary. In some embodiments, screen 7A-01 includes controls to enable the user 101 to claim rewards.

Users are also able to report damage and provide feedback using application 102-4. As explained previously, in some embodiments, transportation user processing subsystem 103-1 to 103-K performs functions related to receiving damage reports. Then, in some embodiments, application 102-4 interacts with transportation user processing subsystem 103-1 to 103-K to perform these functions.

Figure 8A:
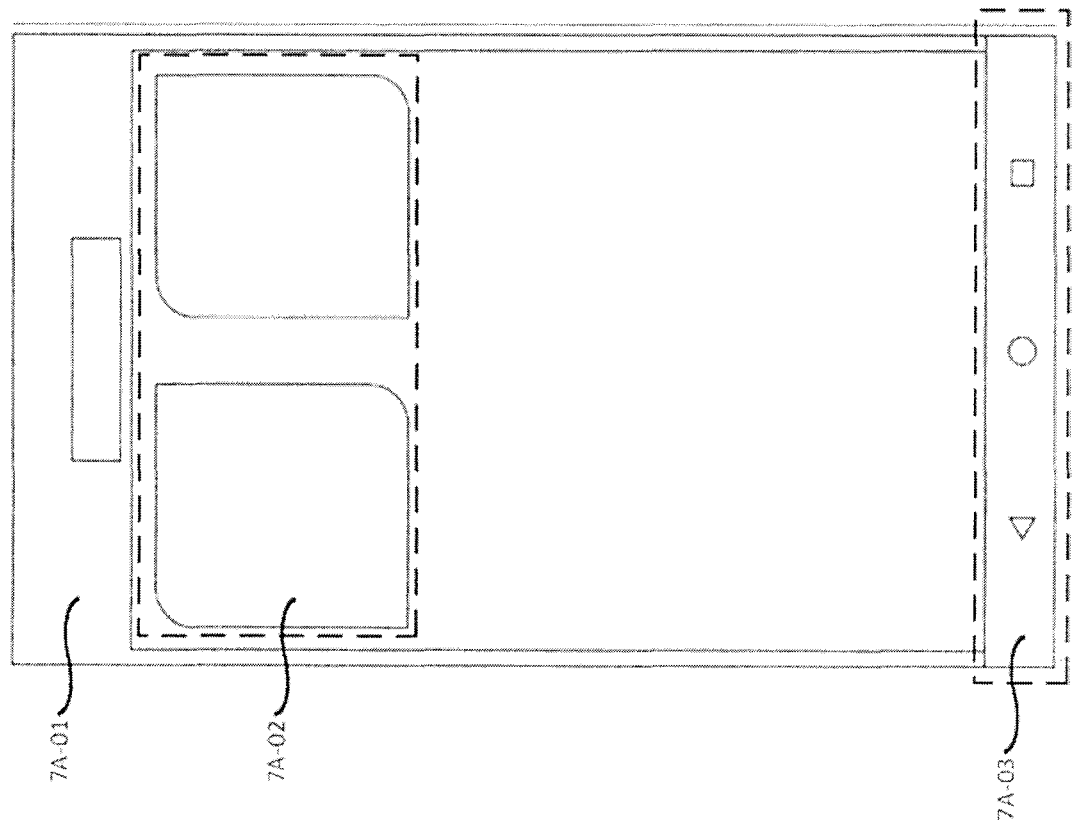
FIGS. 8A-8C illustrate example embodiments of screens for users to report damage and provide feedback.
Figure 8B:
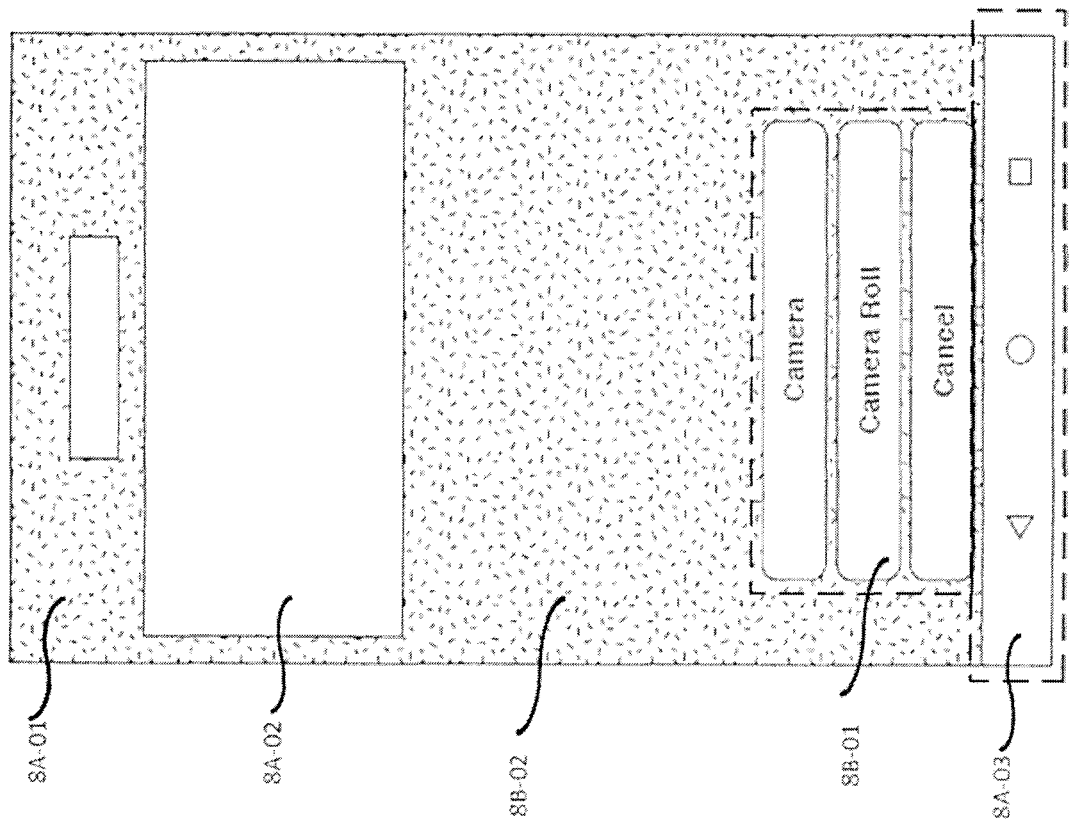
Figure 8C:
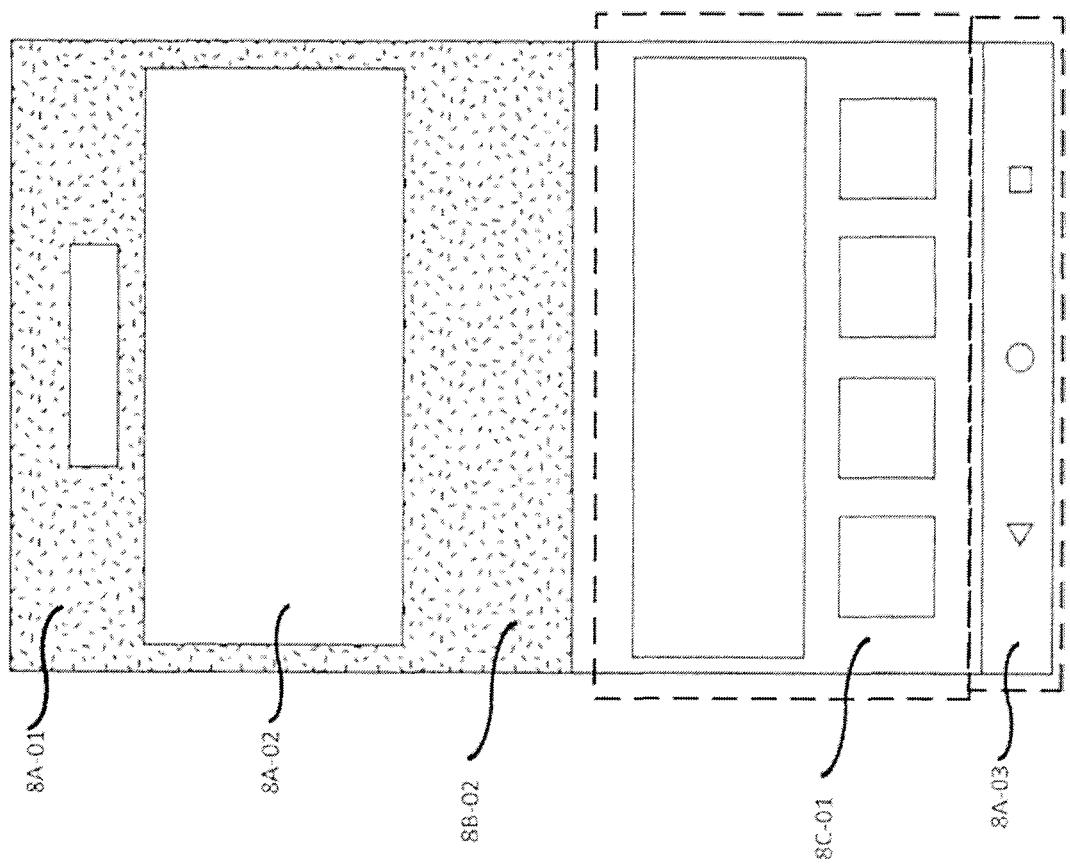

Example screens to enable this are presented in FIGS. 8A-8C. In FIG. 8A, screen 8A-01 allows a user to report damage using area 8A-02. Controls 8A-03 enable the user to move around the application 102-4 as necessary.

FIG. 8B shows screen 8A-01 with area 8A-02 and controls 8A-03 as described previously. Buttons 8B-01 allow a user to take a picture to include within a damage report submitted to transportation user processing subsystem 103-1 to 103-K, and cancel taking such a picture. Area 8B-02 is an overlay.

FIG. 8C shows screen 8A-01 with areas 8A-02 and 8B-01; and controls 8A-03 as described previously. Area 8C-01 allows a user to report damage and share pictures using one or more messaging applications such as, for example, Skype, Android Beam, Whatsapp, Gmail.

As explained previously, users are able to access content provided by content provider processing subsystem 114 from application 102-4. FIGS. 9A to 9D show example embodiments of interfaces from application 102-4 to achieve this.

Figure 9A:
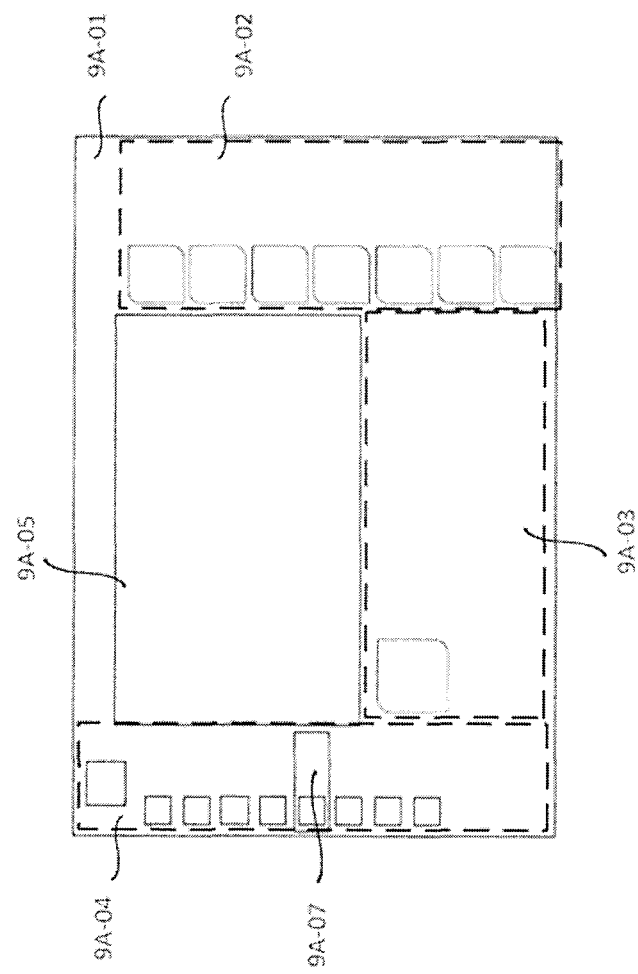
FIGS. 9A-9D illustrate example embodiments of user interfaces to access content provided by content providers.

In FIG. 9A, a content display screen is shown. Screen 9A-01 is one example of example of content provision, that is, provision of streaming broadcast content. Area 9A-02 shows one or more channels that user 101 can stream content from. Area 9A-03 shows, for example, a programming guide for the channel that is being shown. Area 9A-04 is a menu, with selector 9A-07 on the currently selected menu item. 9A-05 is a broadcast streaming viewer. In some embodiments, screen 9A-05 comprises one or more controls including buttons and sliders such as pause button, play button, volume control, selecting positions within the stream and mute button. In a further embodiment, in addition to content, advertisements are also displayed on viewer 9A-05.

Figure 9B:
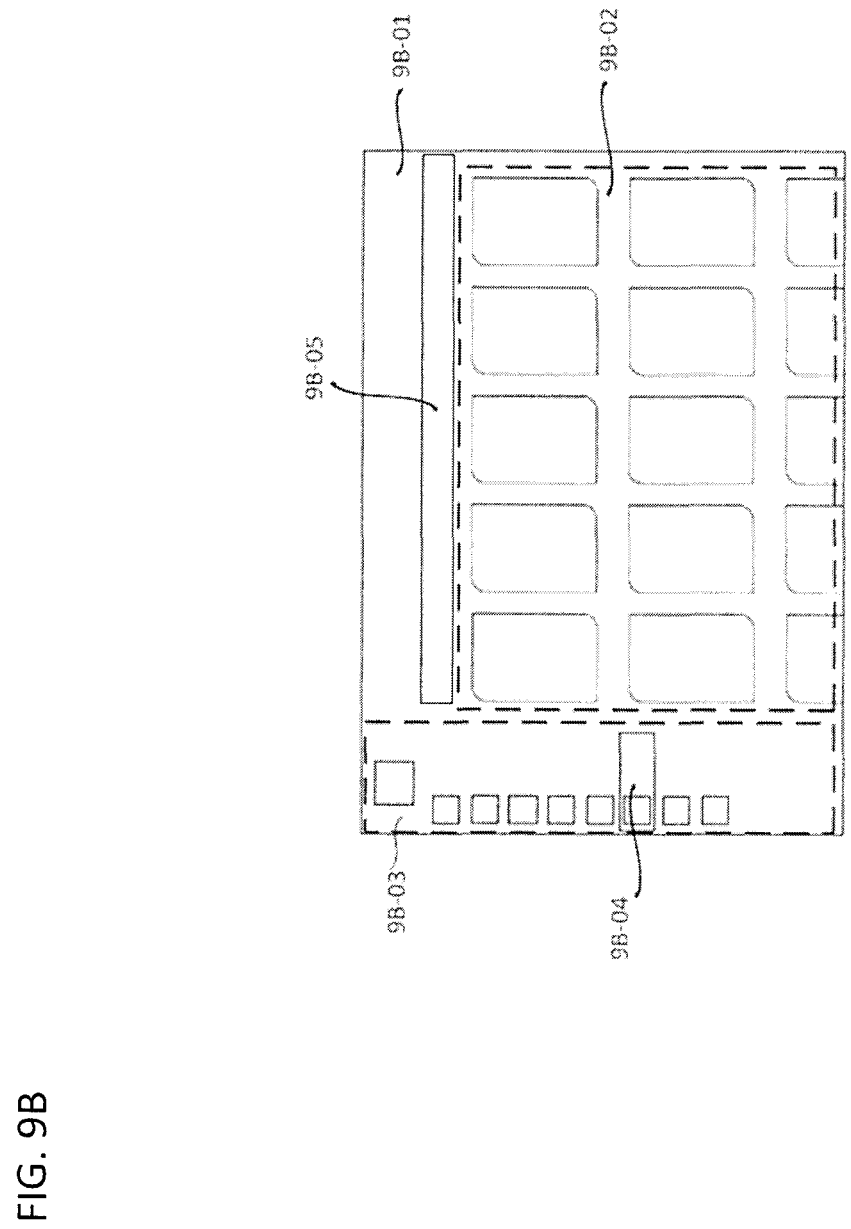

In FIG. 9B, yet another content display screen 9B-01 is shown. In this case, a user 101 can select a video from area 9B-02 by, for example, pressing on a button corresponding to one of the videos in area 9B-02. Menu 9B-03 and selector 9B-04 are similar to menu 9A-04 and selector 9A-07 respectively.

Figure 9C:
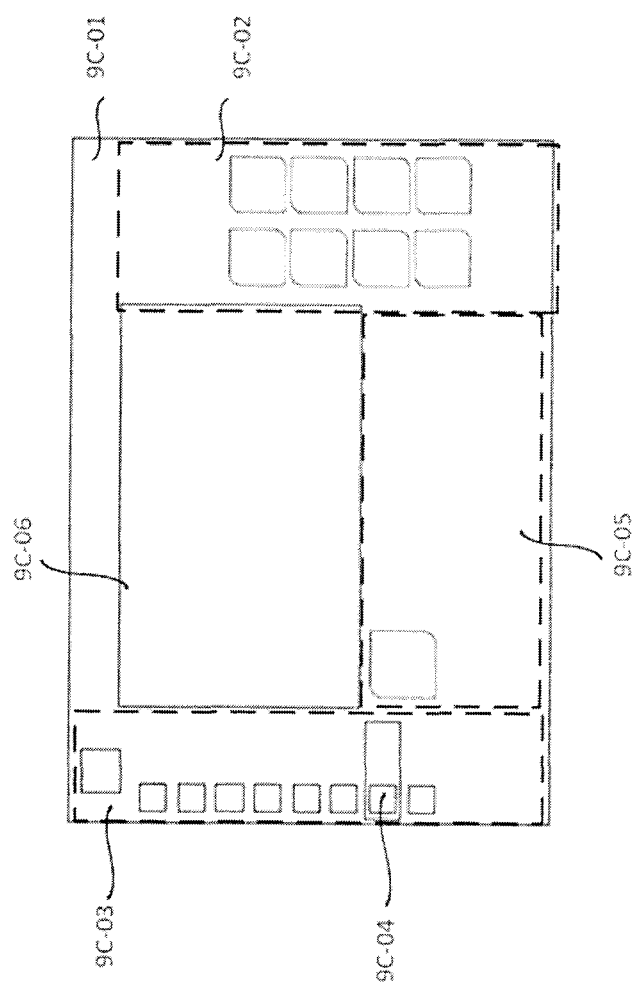

FIG. 9C shows another example of a content display screen 9C-01. Screen 9C-01 is 9C-01 is an example of a screen for provision of streaming radio and podcasts. Area 9C-02 shows one or more radio channels or podcasts that user 101 can experience content from. Area 9C-05 shows, for example, a programming guide for the channel that is being shown. Area 9C-03 is a menu with selector 9C-04 on the currently selected menu item. 9C-06 is a radio streaming screen. In one embodiment, 9C-06 includes controls such as buttons or sliders to enable a user to pause audio, play audio, mute audio, perform tracking functions such as fast forward or increase the volume.

Figure 9D:
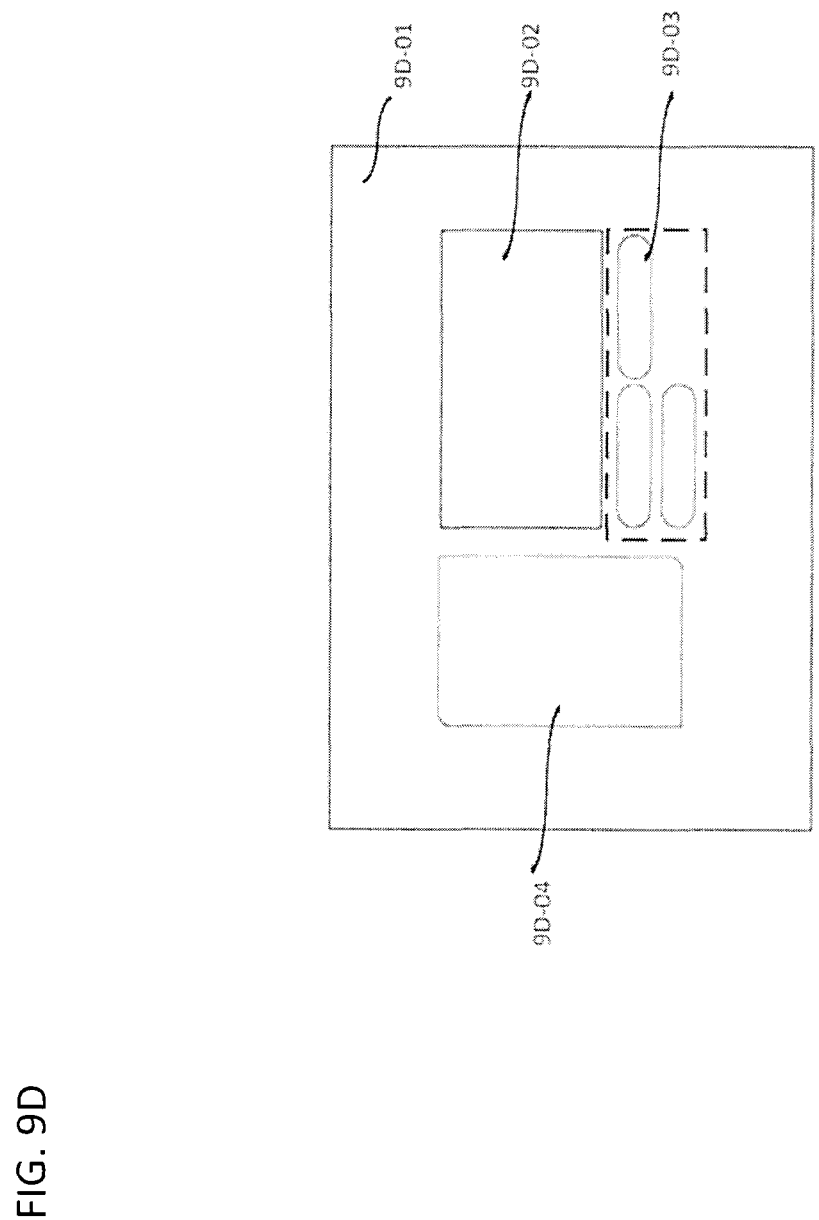

FIG. 9D shows another example of a content display screen 9D-01. Screen 9D-01 is an example of a screen for either rental or purchase of video content. Area 9D-02 shows, for example, information associated with the video such as the title, synopsis, cast of the video, year of release and running time. Area 9D-03 comprises one or more buttons for rental or purchase of the video. In some embodiments it includes a button for a user to watch a trailer. 9D-04 is, for example, an area to display an image associated with the video such as a theatrical release poster.

Figure 10A:
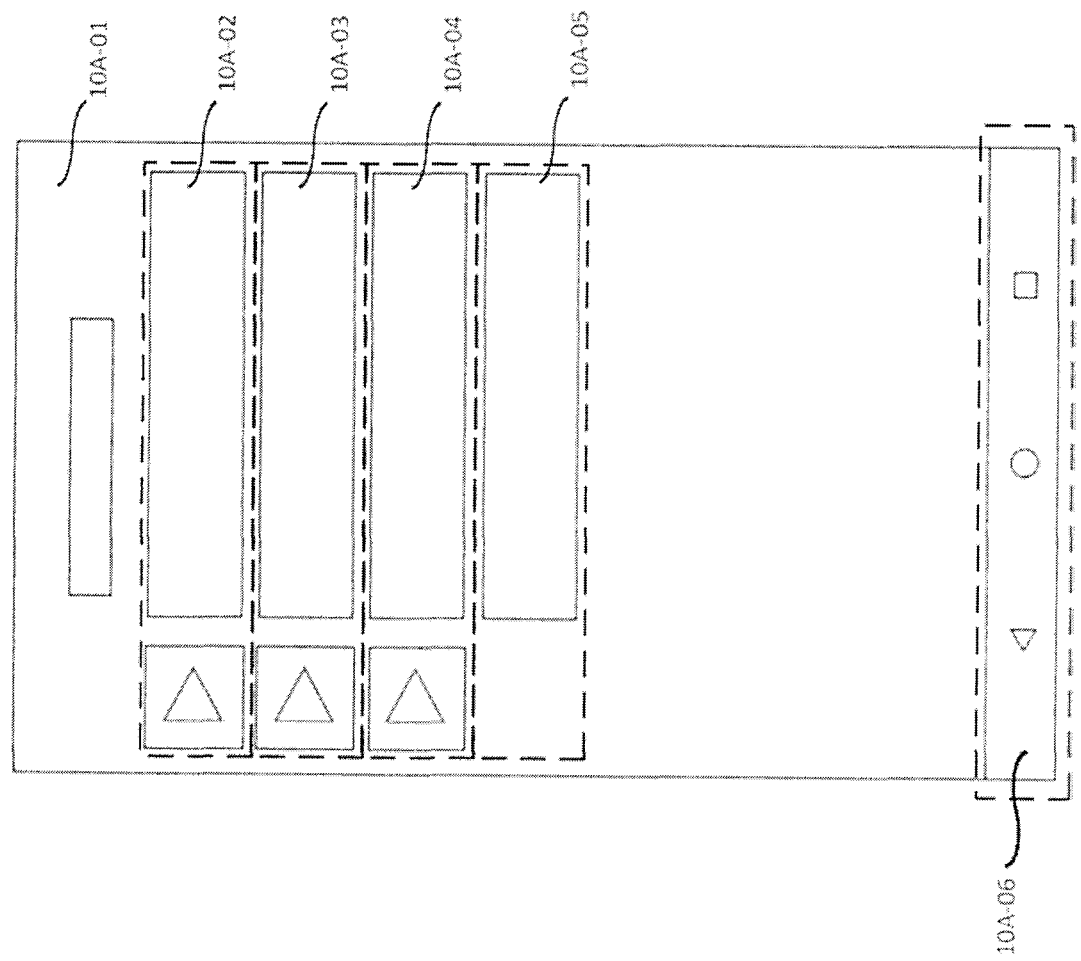
FIG. 10A illustrates an example embodiment of a Frequently Asked Questions (FAQ) screen.

Users are also able to navigate and seek help for usage of various elements of the application 102-4 using a Frequently Asked Question (FAQ) screen. An example FAQ screen 10A-01 is shown in FIG. 10A. In FIG. 10A, screen 10A-01 shows one or more questions and answers. In some embodiments, the answers to the questions in the FAQ are presented using a video demonstration to allow users to understand how to perform various functions. Examples of this are items 10A-02 to 10A-04. In some embodiments, answers are presented in the form of text and images. An example is item 10A-05. Controls 10A-06 allow user 101 to move around application 102-4.

Figure 11A:
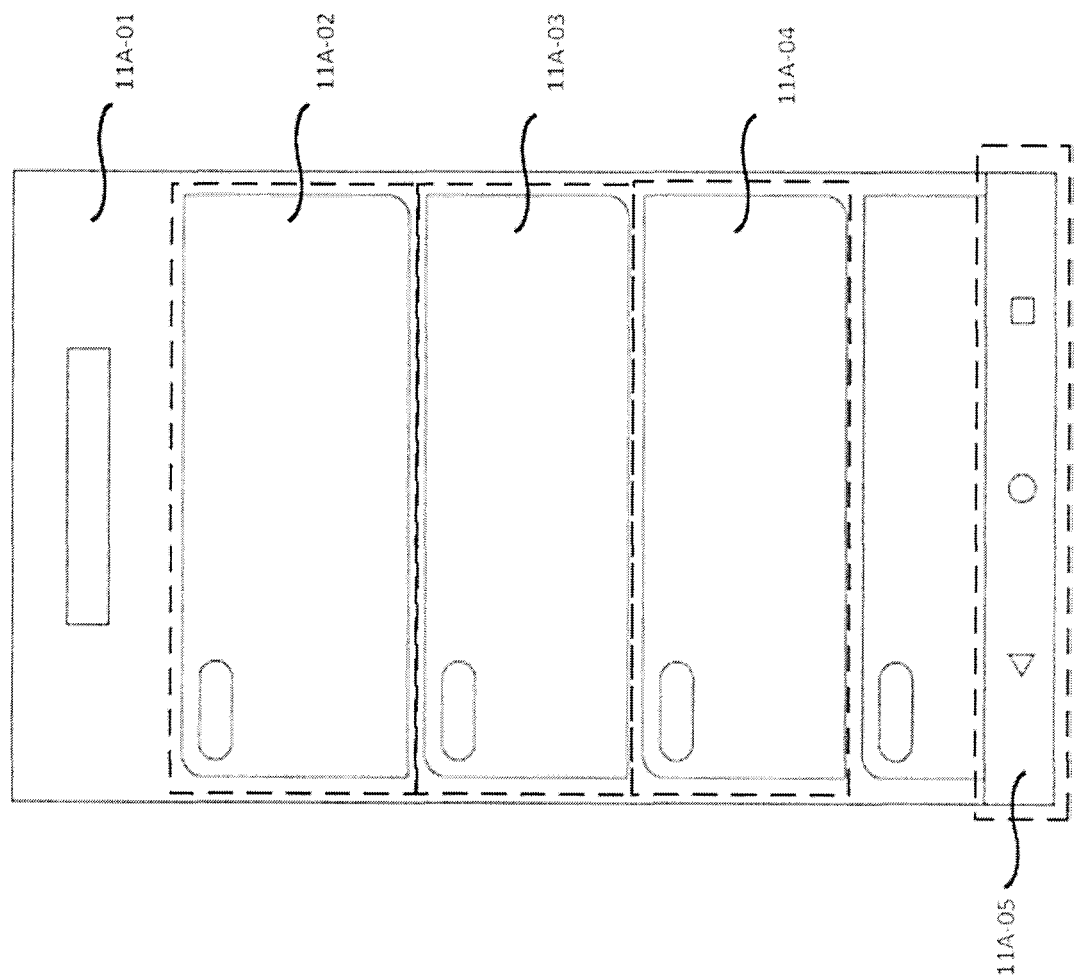
FIG. 11A illustrates an example embodiment of an alert screen.

As explained previously, user 101 is able to read alerts submitted to user device 102 from journey management processing subsystem 104 using application 102-4. An example embodiment of a screen 11A-01 to enable this is shown in FIG. 11A. In screen 11A-01, items 11A-02, 11A-03 and 11A-04 are presented to the user 101. In some embodiment, these alerts include information about delays, closures and alternative routes being used. Controls 11A-05 allow user 101 to move around application 102-4.

Figure 12A:
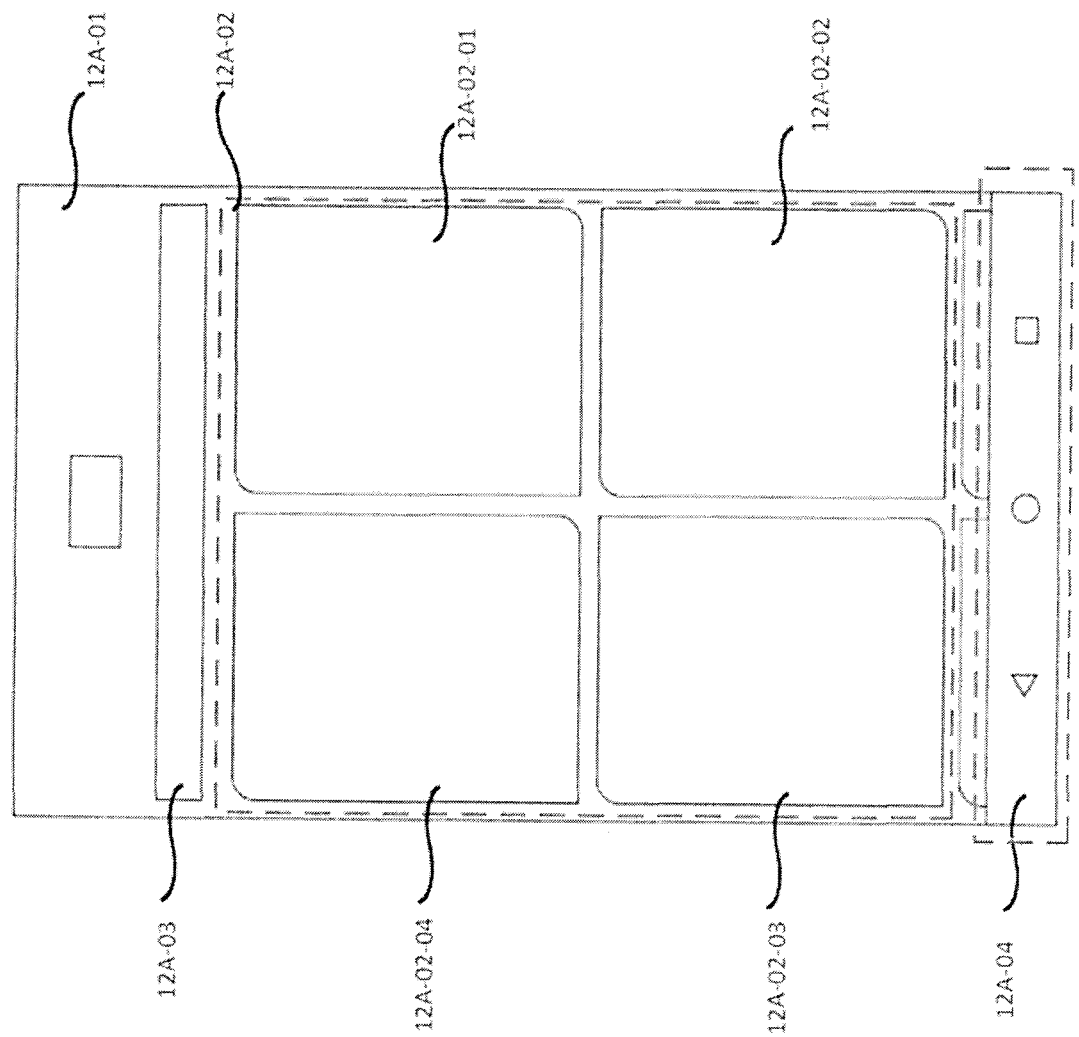
FIGS. 12A-12B illustrates an example embodiment of an interface to allow a user to make purchases from a hospitality and retail provider processing subsystem.

As explained previously, user 101 is also able to access hospitality and retail provider processing subsystem 105 to make purchases via application 102-4. An example embodiment of an interface to achieve this is presented in FIGS. 12A and 12B. In FIG. 12A interface 12A-01 enables a user to purchase items as necessary. Area 12A-02 shows items 12A-02-01 to 12A-02-04 for sale. In some embodiments, these include, for example, descriptions of the items and the sale prices. User 101 selects an item by pressing on it. 12A-03 is a menu to allow a user to navigate to other parts of application 102-4. Controls 12A-04 allow a user to navigate to other apps within the mobile device.

Figure 12B:
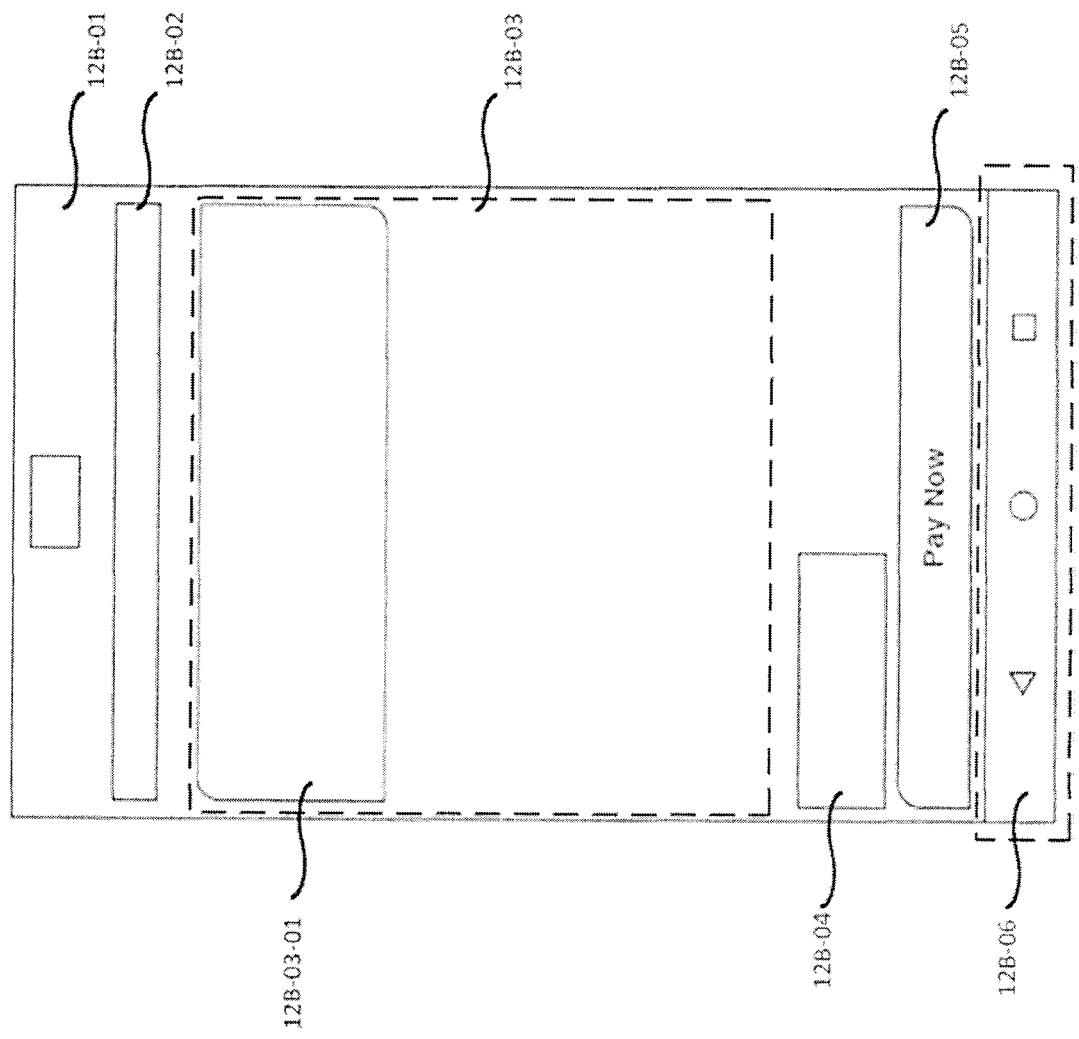

FIG. 12B presents interface 12B-01 to allow a user to purchase one or more items. Menu 12B-02 allows user 101 to navigate around application 102-4 to other pages within the application. Shopping cart area 12B-03 shows one or more items such as item 12B-03-01 which the user 101 intends to purchase. 12B-04 displays the total of the intended purchases in shopping cart area 12B-03. Button 12B-05 allows a user 101 to pay using, for example, a credit card. In some embodiments 12B-05 is a slider. In further embodiments, when the user 101 activates button 12B-05, the user is presented with a plurality of payment options. Controls 12B-06 allow the user to navigate to other applications within the mobile device.

In some embodiments, application 102-4 interacts with other applications running on user device 102 to perform necessary functions. For example, as explained previously and shown in FIGS. 6A and 6B, application 102-4 interacts with applications such as GOOGLE® Maps to perform journey planning. Other interactions are also possible. As shown in FIG. 8C, application 102-4 interacts with other applications to enable damage reporting.

The processes described above can be applied to deliver context dependent user experiences in situations other than transportation. For example, in some embodiments, in addition to transportation communication subsystems 107-1 to 107-N, there are other communication subsystems associated with owners of:
stores;
shopping malls,
cinemas, and
office buildings.

Then part of the context determination will comprise determining which communication subsystem the user device is connected to. Then different actions as detailed above are performed based on the communication subsystem the user device is connected to.

The advantages of such an arrangement are as follows: Instead of a user having to download different apps when the user visits different stores, the user downloads one app which is able to interface to the framework 100. Based on the determined context, the appearance of the app and the appropriate actions are performed as detailed above.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A system to enable a user with an associated user device to receive a context dependent transportation experience, the system comprising:
one or more components coupled to each other and the user device via one or more interconnections, the one or more components comprising:
one or more transportation user processing subsystems;
a first transportation communication subsystem associated with a first transportation system;
a second transportation communication subsystem associated with a second transportation system;
an advertising collection and processing subsystem; and
a context processing subsystem that determines at least one context associated with the user device based at least in part on a determination that the user device is coupled to the first transportation communication subsystem, and transmits, via the one or more interconnections, the determined at least one context to the advertising collection and processing subsystem and the one or more transportation user processing subsystems,
wherein the advertising collection and processing subsystem attributes a first advertising revenue to the first transportation system and transmits a personalized offer to the user device based on the determined at least one context and a user history associated with the user device, and the one or more transportation user processing subsystems deducts one or more portions from a ticket based on the determined at least one context,
wherein the context processing subsystem determines at least one other context associated with the user device based at least in part on a determination that the user device is coupled to the second transportation communication subsystem, transmits the determined at least one other context to the advertising collection and processing subsystem and the one or more transportation user processing subsystems, the advertising collection and processing subsystem attributing a second advertising revenue to the second transportation system based on the determined at least one other context and the one or more transportation user processing subsystems deducting one or more portions from the ticket based on the determined at least one other context.

2. The system of claim 1, further wherein
the one or more transportation user processing subsystems comprises a first transportation user processing subsystem associated with the first transportation system;

the determination of the at least one context comprises determining that the user is travelling within the first transportation system; and the first transportation user processing subsystem deducts the first of the one or more portions from the ticket based on the determined at least one context.

3. The system of claim 2, further wherein the one or more transportation user processing subsystems comprises a second transportation user processing subsystem associated with the second transportation system;

the determination of at least one other context comprises determining that the user is travelling within the second transportation system; and the second transportation user processing subsystem deducts a second of the one or more portions from the ticket based on the determined at least one context.

4. The system of claim 1, wherein:

an application is installed on the user device; and an appearance of the application is based on the determined at least one context.

5. The system of claim 1, wherein:

an application is installed on the user device;

the one or more components comprises a journey management subsystem;

the context processing subsystem transmits the determined at least one context to the journey management subsystem via the one or more interconnections; and the journey management subsystem delivers a service alert to the user device via the application based on the determined at least one context.

6. The system of claim 5, wherein the journey management subsystem communicates with the user device to enable tracking on a map presented by the application.

7. The system of claim 1, wherein:

the one or more components comprises a location identification and tracking processing subsystem;

the location identification and tracking processing subsystem performs identification of a location associated with the user device; and the determination of the at least one context is performed based on the identified location.

8. The system of claim 1, wherein one or more external networks are coupled to the one or more components via the one or more interconnections;

an application is installed on the user device;

the user device is coupled to the one or more components via the one or more external networks;

the determination of the at least one context comprises determining that the user device is coupled to the one or more components via the one or more external networks; and the application restricts access of the user device to one or more services and content provided by the one or more components based on the determination of the user device coupling via the one or more external networks.

9. The system of claim 1, wherein the determination of the at least one context is performed:

either automatically based on a set of user device signals sent by the user device via the one or more interconnections, or based on a request transmitted from the user device via the one or more interconnections, wherein the request comprises service set identifier data and auxiliary data; and the one or more components comprises a content distribution network, the content distribution network comprising one or more proxy servers, the one or more components transmits one or more links to libraries of resources available, the libraries comprising a plurality of files, and the plurality of files stored at the one or more proxy servers.

10. A method to enable a user with an associated user device to receive a context dependent transportation experience using one or more components coupled to each other and the user device via one or more interconnections, the method comprising:

determining, by a context processing subsystem, at least one context associated with the user device based at least in part on a determination that the user device is coupled to a first transportation communication subsystem;

transmitting, by the context processing subsystem via the one or more interconnections, the determined at least one context to an advertising collection and processing subsystem and one or more transportation user processing subsystems, wherein the advertising collection and processing subsystem attributes a first advertising revenue to a first transportation system and transmits a personalized offer to the user device based on the determined at least one context and a user history associated with the user device, and the one or more transportation user processing subsystems deducts one or more portions from a ticket based on the determined at least one context;

determining, by the context processing subsystem, at least one other context associated with the user device based at least in part on a determination that the user device is coupled to a second transportation communication subsystem; and transmitting the determined at least one other context to the advertising collection and processing subsystem and the one or more transportation user processing subsystems, the advertising collection and processing subsystem attributing a second advertising revenue to a second transportation system based on the determined at least one other context and the one or more transportation user processing subsystems deducting one or more portions from the ticket based on the determined at least one other context.

11. The method of claim 10, further wherein:

the one or more transportation user processing subsystems comprises a first transportation user processing subsystem associated with the first transportation system; and the determining of the at least one context comprises determining that the user is travelling within the first transportation system.

12. The method of claim 11, further wherein:

the one or more transportation user processing subsystems comprises a second transportation user processing subsystem associated with the second transportation system;

the determining of at least one other context comprises determining that the user is travelling within the second transportation system; and the second transportation user processing subsystem deducts a second of the one or more portions from the ticket based on the determined at least one context.

13. The method of claim 10, further comprising:

providing an application for installing on the user device, wherein an appearance of the application is based on the determined at least one context.

14. The method of claim 10, further comprising:
providing an application for installing on the user device; the one or more components comprises a journey management subsystem;
transmitting, by the context processing subsystem, the determined at least one context to the journey management subsystem via the one or more interconnections; and
delivering, by the journey management subsystem, a service alert to the user device via the provided application based on the determined at least one context.

15. The method of claim 14, wherein the journey management subsystem enables tracking on a map presented by the application.

16. The method of claim 10, further comprising:
identifying, by a location identification and tracking processing subsystem, a location associated with the user device; and
the determining of the at least one context is performed based at least in part on the identified location.

17. The method of claim 10, further comprising:
providing an application for installation on the user device;
wherein the determining of the at least one context comprises determining that the user device is coupled to the one or more components via one or more external networks; and
restricting, by the provided application, access of the user device to one or more services and content provided by the one or more components based on the determining that the user device is coupled to the one or more components via the one or more external networks.

18. A non-transitory computer readable storage medium having computer-executable instructions for providing a context dependent transportation experience that, upon execution by a computer cause the computer to perform operations comprising:
determining, by a context processing subsystem, at least one context associated with the user device based at least in part on a determination that the user device is coupled to a first transportation communication subsystem;
transmitting, by the context processing subsystem via one or more interconnections, the determined at least one context to an advertising collection and processing subsystem and one or more transportation user processing subsystems, wherein the advertising collection and processing subsystem attributes a first advertising revenue to a first transportation system and transmits a personalized offer to the user device based on the determined at least one context and a user history associated with the user device, and the one or more transportation user processing subsystems deducts one or more portions from a ticket based on the determined at least one context;
determining, by the context processing subsystem, at least one other context associated with the user device based at least in part on a determination that the user device is coupled to a second transportation communication subsystem; and
transmitting the determined at least one other context to the advertising collection and processing subsystem and the one or more transportation user processing subsystems, the advertising collection and processing subsystem attributing a second advertising revenue to a second transportation system based on the determined at least one other context and the one or more transportation user processing subsystems deducting one or more portions from the ticket based on the determined at least one other context.

* * * * *